United States Patent
Nair et al.

(10) Patent No.: US 10,628,837 B2
(45) Date of Patent: Apr. 21, 2020

(54) SYSTEM AND METHOD FOR MODELING CUSTOMER BEHAVIOR

(71) Applicant: Visa International Service Association, San Francisco, CA (US)

(72) Inventors: Manoj Sreekumaran Nair, Dubai (AE); Bhavin Girish Gangar, Dubai (AE); Ali Zahid, Bur Dubai (AE); Anuradha Vijayakrishnan, Dubai (AE)

(73) Assignee: Visa International Service Association, San Francisco, CA (US)

( * ) Notice: Subject to any disclaimer, the term of this patent is extended or adjusted under 35 U.S.C. 154(b) by 251 days.

(21) Appl. No.: 15/679,622

(22) Filed: Aug. 17, 2017

(65) Prior Publication Data
US 2019/0057400 A1 Feb. 21, 2019

(51) Int. Cl.
*G06Q 30/02* (2012.01)
*G06Q 20/40* (2012.01)
*G06Q 20/20* (2012.01)

(52) U.S. Cl.
CPC ......... *G06Q 30/0201* (2013.01); *G06Q 20/20* (2013.01); *G06Q 20/40* (2013.01); *G06Q 30/0226* (2013.01)

(58) Field of Classification Search
CPC . G06Q 30/0201; G06Q 20/40; G06Q 30/0226
USPC ....................................................... 705/7.29
See application file for complete search history.

(56) References Cited

U.S. PATENT DOCUMENTS

2016/0224997 A1* 8/2016 Blackhurst ......... G06Q 30/0202

FOREIGN PATENT DOCUMENTS

WO WO-2011094080 A2 * 8/2011 ............. G06Q 30/08

OTHER PUBLICATIONS

Amrish Gupta, Build a Successful Customer Behavior Analytics Model, 2017 (Year: 2017).*

* cited by examiner

*Primary Examiner* — Tarek Elchanti
(74) *Attorney, Agent, or Firm* — The Webb Law Firm

(57) ABSTRACT

A system and method for modeling customer behavior determines an identified merchant engagement level of at least one customer with respect to an identified merchant based at least partially on transaction data associated with a plurality of transactions between the at least one customer and the plurality of merchants. A peer merchant engagement level of the at least one customer with respect to the at least one peer merchant is determined based at least partially on the transaction data. A loyalty segment of the at least one customer is determined based at least partially on the identified merchant engagement level of the at least one customer and the peer merchant engagement level of the at least one customer. A target action associated with the identified merchant with respect to the at least one customer is automatically initiated, or caused to be initiated, based at least partially on the loyalty segment of the at least one customer.

15 Claims, 8 Drawing Sheets

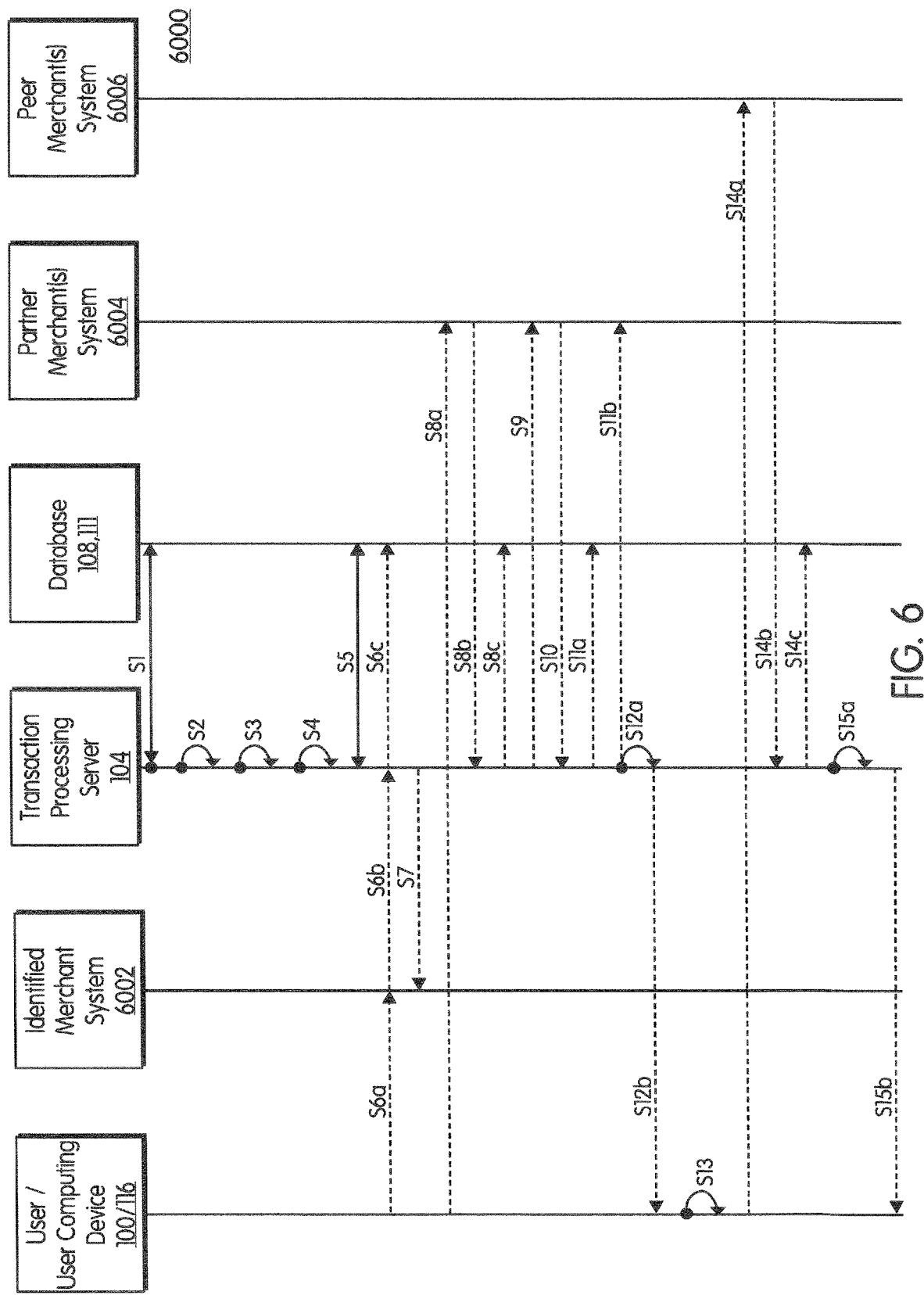

Example Localities in a City with Wallet Share Growth Potential for Identified Merchant

| | Top 10 localities by market spend | Transaction Data Category spend - distribution (%) | Indexed growth rate (Locality) | Indexed % switchers |
|---|---|---|---|---|
| 1 | Down Town / Business Bay | 18% | ⊘ | ○ |
| 2 | Marina & Jbr & Palm | 11% | ⊘ | ○ |
| 3 | Mirdif | 9% | ○ | ⊘ |
| 4 | Jumeirah / Umm Suqeim | 9% | ⊘ | ⊘ |
| 5 | Trade Center / Zabeel | 8% | ⊘ | ○ |
| 6 | Al Barsha (Affl) | 8% | ⊘ | ○ |
| 7 | Garhoud | 5% | ○ | ○ |
| 8 | Jlt | 2% | ○ | ○ |
| 9 | Ibn Battuta | 2% | ⊘ | ⊘ |
| 10 | Satwa | 2% | ⊘ | ⊘ |
| | Dubai | 100% | | |

○Higher than Dubai avg  ○Higher than Dubai avg
⊘Lower than Dubai avg   ⊘Lower than Dubai avg Merchant Objective: Identify localities with high switcher penetration and high spend share/high locality growth rates for wallet share growth opportunities

FIG. 7

SYSTEM AND METHOD FOR MODELING CUSTOMER BEHAVIOR

BACKGROUND OF THE INVENTION

Field of the Invention

This invention relates generally to modeling customer behavior and, in some non-limiting embodiments or aspects, to a method, system, and computer program product for classifying and segmenting customers in a behavior-monitored system in which the customers have transactions with merchants.

Description of Related Art

Behavior-monitored systems, such as payment processing systems, monitor the behavior of functional entities therein, such as merchants and customers. Merchants need information about markets and customer behavior therein to better meet business objectives. Models can be used to help merchants know, understand, and/or simulate customer behavior in a market. However, conventional models available to merchants typically lack knowledge and understanding of a merchant's own business, customers, competitors, and potential partners. For example, conventional models typically lack information with respect to market share, market share at specific locations, profiles of customers, transactions of customers, engagement levels of customers, locations of customers, spending and/or growth potential at specific locations, potential merchant partners, and the like. Further, conventional models available to merchants focus only on customer spending and lack customer demographic and geographic context, are subjective and based at least partially on personal judgment, are derived from manual, time consuming, and non-scalable analysis, and/or are impossible to discern for unknown markets, which inhibits merchants from accurately targeting customers to increase penetration in specific markets and/or increase wallet share growth with respect to specific customer demographics and/or locations.

Therefore, there is a need in the art for behavior-monitored systems and merchants to be able to better model customer behavior in markets and generate and analyze information beyond customer spending that provides greater knowledge and understanding of a merchant's own business, customers, competitors, and potential partners, including analysis of customer demographics and/or locations for increased penetration in specific markets and/or wallet share growth, and that enables customers to be more accurately targeted with specific and automatic messages, marketing, and incentives and/or automatically enrolled in specific incentive programs, as well as enables transactions of customers to be automatically modified according to merchant objectives.

SUMMARY OF THE INVENTION

Accordingly, provided is an improved method, system, and computer program product for modeling customer behavior in a behavior-monitored system, the plurality of customers having a plurality of transactions with a plurality of merchants.

According to a non-limiting embodiment or aspect, provided is a computer-implemented method for modeling customer behavior in a behavior-monitored system, the computer-implemented method comprising: determining, with at least one processor, an identified merchant engagement level of at least one customer with respect to an identified merchant of a plurality of merchants based at least partially on transaction data associated with a plurality of transactions between the at least one customer and the plurality of merchants, wherein the identified merchant of the plurality of merchants is associated with at least one peer merchant of the plurality of merchants; determining, with at least one processor, a peer merchant engagement level of the at least one customer with respect to the at least one peer merchant based at least partially on the transaction data; determining, with at least one processor, a loyalty segment of the at least one customer based at least partially on the identified merchant engagement level of the at least one customer and the peer merchant engagement level of the at least one customer; and automatically initiating, or causing the initiation of, with at least one processor, a target action associated with the identified merchant with respect to the at least one customer based at least partially on the loyalty segment of the at least one customer.

In one non-limiting embodiment or aspect, the method further comprises: identifying, with at least one processor, the at least one peer merchant associated with the identified merchant based at least partially on the transaction data.

In one non-limiting embodiment or aspect, the method further comprises: identifying, with at least one processor, the at least one peer merchant as including at least one other merchant of the plurality of merchants if the at least one customer initiates a transaction with the at least one other merchant and a transaction at the at least one peer merchant.

In one non-limiting embodiment or aspect, the method further comprises: determining, with at least one processor, customer attributes associated with the at least one customer based at least partially on the transaction data, wherein the customer attributes include at least one of the following: an amount spent by the at least one customer at a merchant over a period of time, a number of transactions by the at least one customer at the merchant over the period of time, an average amount spent per transaction by the at least one customer at the merchant over the period of time, an average amount of time between transactions and/or since a last transaction by the at least one customer at the merchant over the period of time, a number of other merchants at which the at least one customer has transactions over the period of time, or any combination thereof, wherein the identified merchant engagement level of the at least one customer is determined based at least partially on the customer attributes associated with the at least one customer for the identified merchant, and wherein the peer merchant engagement level of the at least one customer is determined based at least partially on the customer attributes associated with the at least one customer for the at least one peer merchant.

In one non-limiting embodiment or aspect, determining, with at least one processor, the loyalty segment of the at least one customer further comprises comparing, the identified merchant engagement level of the at least one customer and the peer merchant engagement level of the at least one customer to at least one threshold level.

In one non-limiting embodiment or aspect, the loyalty segment indicates a probability that the at least one customer is at least one of the following: loyal to the identified merchant, willing to switch from the at least one peer merchant to the identified merchant, disengaged from the identified merchant, disengaged from a specific type of transaction associated with the identified merchant, or any combination thereof.

In one non-limiting embodiment or aspect, the method further comprises: classifying, with at least one processor, the at least one customer into one of an identified merchant high engagement band, an identified merchant moderate engagement band, and an identified merchant low engagement band based at least partially on the identified merchant engagement level of the at least one customer; classifying, with at least one processor, the at least one customer into one of a peer merchant high engagement band, a peer merchant moderate engagement band, and a peer merchant low engagement band based at least partially on the peer merchant engagement level of the at least one customer.

In one nonlimiting embodiment or aspect, the method further comprises: comparing, with at least one processor, the identified merchant high engagement band, the identified merchant moderate engagement band, and the identified merchant low engagement band against the peer merchant high engagement band, the peer merchant moderate engagement band, and the peer merchant low engagement band to determine the loyalty segment of the at least one customer.

In one non-limiting embodiment or aspect, the method further comprises: classifying, with at least one processor, the at least one customer into a first loyalty segment based at least partially on a determination that the at least one customer is: i) classified in the identified merchant high engagement band and classified outside the peer merchant high engagement band or ii) classified in the identified merchant moderate engagement band and classified in the peer merchant low engagement band; classifying, with at least one processor, the at least one customer into a second loyalty segment based at least partially on a determination that the at least one customer is: i) classified in the identified merchant high engagement band and classified in the peer merchant high engagement band or ii) classified in the identified merchant moderate engagement band and classified outside the peer merchant low engagement band; classifying, with at least one processor, the at least one customer into a third loyalty segment based at least partially on a determination that the at least one customer is classified in the identified merchant low engagement band and classified outside the peer merchant low engagement band; and classifying, with at least one processor, the at least one customer into a fourth loyalty segment based at least partially on a determination that the at least one customer is classified in the identified merchant low engagement band and classified in the peer merchant low engagement band.

In one non-limiting embodiment or aspect, the target action comprises automatically enrolling, with at least one processor, the at least one customer in an incentive program based at least partially on the loyalty segment of the at least one customer.

In one non-limiting embodiment or aspect, the target action comprises automatically modifying, with at least one processor, a current transaction of the at least one customer based at least partially on the loyalty segment of the at least one customer.

In one non-limiting embodiment or aspect, the method further comprises: receiving, with at least one processor, current transaction data associated with at least one current transaction of the at least one customer with at least one other merchant; determining, with at least one processor, the loyalty segment of the at least one customer based at least partially on the current transaction data; and communicating, in response to the determination, an authorization request message to the at least one merchant, wherein the authorization request message includes at least one of the following: a request to enroll the at least one customer in at least one incentive program associated with the identified merchant, a request to modify the at least one current transaction, or any combination thereof; receiving, with at least one processor, an authorization response message after communicating the authorization request message; and with the at least one processor, at least one of the following: automatically enrolling the at least one customer in the at least one incentive program, automatically modifying the at least one current transaction, or any combination thereof.

In one non-limiting embodiment or aspect, the method further comprises: receiving, with at least one processor, current transaction data associated with at least one current transaction of the at least one customer with at least one other merchant; determining, with at least one processor, the loyalty segment of the at least one customer based at least partially on the current transaction data; and communicating, in response to the determination, a targeted message to a mobile device of the at least one customer, wherein the targeted messages causes the mobile device of the at least one customer to automatically display at least one of the following: a redemption offer data associated with the identified merchant, program data associated with a merchant loyalty program associated with the identified merchant, or any combination thereof.

In one non-limiting embodiment or aspect, the plurality of transactions is between a plurality of customers and the plurality of merchants, the plurality of customers including the at least one customer, and the method further comprises: determining, with at least one processor, the identified merchant engagement level of each customer of the plurality of customers with respect to the at least one peer merchant based at least partially on the transaction data; determining, with at least one processor, the peer merchant engagement level of each customer of the plurality of customers with respect to the at least one peer merchant based at least partially on the transaction data; segmenting, with at least one processor, the plurality of customers into a plurality of loyalty segments based at least partially on the identified merchant engagement level of each customer of the plurality of customers and the peer merchant engagement level of each customer of the plurality of customers.

In one non-limiting embodiment or aspect, the method further comprises: identifying, with at least one processor, the at least one peer merchant associated with the identified merchant based at least partially on the transaction data.

In one non-limiting embodiment or aspect, the method further comprises: comparing, with at least one processor, a probability of the plurality of customers having at least one transaction at the identified merchant without having a transaction with at least one other merchant of the plurality of merchants to a probability of the plurality of customers having at least one transaction at the identified merchant and having at least one transaction at the at least one other merchant of the plurality of merchants to determine a peer level between the identified merchant and the at least one other merchant; and identifying, with at least one processor, the at least one peer merchant as including the at least one other merchant if the peer level between the identified merchant and the at least one other merchant meets or exceeds a threshold level.

In one non-limiting embodiment or aspect, the method further comprises: determining, with at least one processor, customer attributes associated with the plurality of customers based at least partially on the transaction data, wherein the customer attributes include at least one of the following: an amount spent by a customer at a merchant over a period of time, a number of transactions by the customer at the merchant over the period of time, an average amount spent per transaction by the customer at the merchant over the period of time, an average amount of time between transactions and/or since a last transaction by the customer at the merchant over the period of time, a number of other merchants at which the customer has transactions over the period of time, or any combination thereof, wherein the identified merchant engagement level of each customer is determined based at least partially on the customer attributes associated with that customer for the identified merchant, and wherein the peer merchant engagement level of each customer is determined based at least partially on the customer attributes associated with that customer for the at least one peer merchant.

In one non-limiting embodiment or aspect, segmenting, with at least one processor, the plurality of customers into the plurality of loyalty segments further comprises comparing, for each customer of the plurality of customers, the identified merchant engagement level of that customer and the peer merchant engagement level of that customer to at least one threshold level.

In one non-limiting embodiment or aspect, each of the plurality of loyalty segments indicates a probability that a subset of customers in that segment is at least one of the following: loyal to the identified merchant, willing switch from the at least one peer merchant to the identified merchant, disengaged from the identified merchant, disengaged from a specific type of transaction associated with the identified merchant, or any combination thereof.

In one non-limiting embodiment or aspect, the method further comprises: segmenting, with at least one processor, the plurality of customers into one of an identified merchant high engagement band, an identified merchant moderate engagement band, and an identified merchant low engagement band based at least partially on the identified merchant engagement level of each customer; segmenting, with at least one processor, the plurality of customers into one of a peer merchant high engagement band, a peer merchant moderate engagement band, and a peer merchant low engagement band based at least partially on the peer merchant engagement level of each customer.

In one non-limiting embodiment or aspect, the method further comprises: comparing, with at least one processor, the identified merchant high engagement band, the identified merchant moderate engagement band, and the identified merchant low engagement band against the peer merchant high engagement band, the peer merchant moderate engagement band, and the peer merchant low engagement band to segment the plurality of customers into the plurality of loyalty segments.

In one non-limiting embodiment or aspect, the method further comprises: segmenting, with at least one processor, a customer of the plurality of customers into a first segment of the plurality of loyalty segments based at least partially on a determination that the customer is: i) segmented in the identified merchant high engagement band and segmented outside the peer merchant high engagement band or ii) segmented in the identified merchant moderate engagement band and segmented in the peer merchant low engagement band; segmenting, with at least one processor, the customer of the plurality of customers into a second segment of the plurality of loyalty segments based at least partially on a determination that the customer is: i) segmented in the identified merchant high engagement band and segmented in the peer merchant high engagement band or ii) segmented in the identified merchant moderate engagement band and segmented outside the peer merchant low engagement band; segmenting, with at least one processor, the customer of the plurality of customers into a third segment of the plurality of loyalty segments based at least partially on a determination that the customer is segmented in the identified merchant low engagement band and segmented outside the peer merchant low engagement band; and segmenting, with at least one processor, the customer of the plurality of customers into a fourth segment of the plurality of loyalty segments based at least partially on a determination that the customer is segmented in the identified merchant low engagement band and segmented in the peer merchant low engagement band.

In one non-limiting embodiment or aspect, the method further comprises: applying, with at least one processor, at least one rule based at least partially on at least one identified merchant objective to at least one target subset of customers in at least one target segment of the plurality of loyalty segments to identify at least one focus subset of customers of the plurality of customers.

In one non-limiting embodiment or aspect, the at least one rule is based at least partially on geographic locations of the plurality of customers, ages of the plurality of customers, incomes of the plurality of customers, or any combination thereof.

In one non-limiting embodiment or aspect, each customer of the at least one focus subset of customers is associated with a same at least one of the following: geographic location, age range, income range, or any combination thereof.

In one non-limiting embodiment or aspect, the at least one identified merchant objective indicates at least the at least one target segment to which the at least one rule is applied.

In one non-limiting embodiment or aspect, the method further comprises: determining, with at least one processor, a profile of the at least one focus subset of customers based at least partially on the transaction data associated with the at least one subset of customers.

In one non-limiting embodiment or aspect, the method further comprises: identifying, with at least one processor, at least one other merchant of the plurality of merchants based at least partially on the profile of the at least one subset of customers; automatically enrolling, with at least one processor, the at least one subset of customers in at least one incentive program associated with the at least one other merchant.

In one non-limiting embodiment or aspect, the target action comprises automatically enrolling, with at least one processor, the at least one customer of the plurality of customers in an incentive program based at least partially on the loyalty segment in which the at least one customer is segmented.

In one non-limiting embodiment or aspect, the target action comprises automatically modifying, with at least one processor, a current transaction of the at least one customer of the plurality of customers based at least partially on the loyalty segment in which the at least one customer is segmented.

In one non-limiting embodiment or aspect, the method further comprises: receiving, with at least one processor, current transaction data associated with at least one current transaction of the at least one customer with at least one other merchant; determining, with at least one processor, the loyalty segment in which the at least one customer is segmented based at least partially on the current transaction data; and communicating, in response to the determination, an authorization request message to the at least one merchant, wherein the authorization request message includes at least one of the following: a request to enroll the at least one customer in at least one incentive program associated with the identified merchant, a request to modify the at least one current transaction, or any combination thereof; receiving, with at least one processor, an authorization response message after communicating the authorization request message; and with the at least one processor, at least one of the following: automatically enrolling the at least one customer in the at least one incentive program, automatically modifying the at least one current transaction, or any combination thereof.

In one non-limiting embodiment or aspect, the method further comprises: receiving, with at least one processor, current transaction data associated with at least one current transaction of the at least one customer with at least one other merchant; determining, with at least one processor, the loyalty segment in which the at least one customer is segmented based at least partially on the current transaction data; and communicating, in response to the determination, a targeted message to a mobile device of the at least one customer, wherein the targeted messages causes the mobile device of the at least one customer to automatically display at least one of the following: a redemption offer data associated with the identified merchant, program data associated with a merchant loyalty program associated with the identified merchant, or any combination thereof.

According to a non-limiting embodiment or aspect, provided is a system for modeling customer behavior in a behavior-monitored system, the system comprising at least one server computer including at least one processor, the at least one server computer programmed and/or configured to: determine an identified merchant engagement level of at least one customer with respect to an identified merchant of a plurality of merchants based at least partially on transaction data associated with a plurality of transactions between the at least one customer and the plurality of merchants, wherein the identified merchant of the plurality of merchants is associated with at least one peer merchant of the plurality of merchants; determine a peer merchant engagement level of the at least one customer with respect to the at least one peer merchant based at least partially on the transaction data; determine a loyalty segment of the at least one customer based at least partially on the identified merchant engagement level of the at least one customer and the peer merchant engagement level of the at least one customer; and automatically initiate, or cause the initiation of, with at least one processor, a target action associated with the identified merchant with respect to the at least one customer based at least partially on the loyalty segment of the at least one customer.

In one non-limiting embodiment or aspect, the at least one server computer is programmed and/or configured to: identify the at least one peer merchant associated with the identified merchant based at least partially on the transaction data.

In one non-limiting embodiment or aspect, the at least one server computer is programmed and/or configured to: identify the at least one peer merchant as including at least one other merchant of the plurality of merchants if the at least one customer initiates a transaction with the at least one other merchant and a transaction at the at least one peer merchant.

In one non-limiting embodiment or aspect, the at least one server computer is programmed and/or configured to: determine customer attributes associated with the at least one customer based at least partially on the transaction data, wherein the customer attributes include at least one of the following: an amount spent by the at least one customer at a merchant over a period of time, a number of transactions by the at least one customer at the merchant over the period of time, an average amount spent per transaction by the at least one customer at the merchant over the period of time, an average amount of time between transactions and/or since a last transaction by the at least one customer at the merchant over the period of time, a number of other merchants at which the at least one customer has transactions over the period of time, or any combination thereof, wherein the identified merchant engagement level of the at least one customer is determined based at least partially on the customer attributes associated with the at least one customer for the identified merchant, and wherein the peer merchant engagement level of the at least one customer is determined based at least partially on the customer attributes associated with the at least one customer for the at least one peer merchant.

In one non-limiting embodiment or aspect, the at least one server computer is programmed and/or configured to: compare, the identified merchant engagement level of the at least one customer and the peer merchant engagement level of the at least one customer to at least one threshold level to determine the loyalty segment of the at least one customer.

In one non-limiting embodiment or aspect, the loyalty segment indicates a probability that the at least one customer is at least one of the following: loyal to the identified merchant, willing switch from the at least one peer merchant to the identified merchant, disengaged from the identified merchant, disengaged from a specific type of transaction associated with the identified merchant, or any combination thereof.

In one non-limiting embodiment or aspect, the at least one server computer is programmed and/or configured to: classify the at least one customer into one of an identified merchant high engagement band, an identified merchant moderate engagement band, and an identified merchant low engagement band based at least partially on the identified merchant engagement level of the at least one customer; classify the at least one customer into one of a peer merchant high engagement band, a peer merchant moderate engagement band, and a peer merchant low engagement band based at least partially on the peer merchant engagement level of the at least one customer.

In one non-limiting embodiment or aspect, the at least one server computer is programmed and/or configured to: compare the identified merchant high engagement band, the identified merchant moderate engagement band, and the identified merchant low engagement band against the peer merchant high engagement band, the peer merchant moderate engagement band, and the peer merchant low engagement band to determine the loyalty segment of the at least one customer.

In one non-limiting embodiment or aspect, the at least one server computer is programmed and/or configured to: classify the at least one customer into a first loyalty segment based at least partially on a determination that the at least one customer is: i) classified in the identified merchant high engagement band and classified outside the peer merchant high engagement band or ii) classified in the identified merchant moderate engagement band and classified in the peer merchant low engagement band; classify the at least one customer into a second loyalty segment based at least partially on a determination that the at least one customer is: i) classified in the identified merchant high engagement band and classified in the peer merchant high engagement band or ii) classified in the identified merchant moderate engagement band and classified outside the peer merchant low engagement band; classify the at least one customer into a third loyalty segment based at least partially on a determination that the at least one customer is classified in the identified merchant low engagement band and classified outside the peer merchant low engagement band; and classify the at least one customer into a fourth loyalty segment based at least partially on a determination that the at least one customer is classified in the identified merchant low engagement band and classified in the peer merchant low engagement band.

In one non-limiting embodiment or aspect, the target action comprises automatically enrolling the at least one customer in an incentive program based at least partially on the loyalty segment of the at least one customer.

In one non-limiting embodiment or aspect, the target action comprises automatically modifying a current transaction of the at least one customer based at least partially on the loyalty segment of the at least one customer.

In one non-limiting embodiment or aspect, the at least one server computer is programmed and/or configured to: receive current transaction data associated with at least one current transaction of the at least one customer with at least one other merchant; determine the loyalty segment of the at least one customer based at least partially on the current transaction data; and communicate, in response to the determination, an authorization request message to the at least one merchant, wherein the authorization request message includes at least one of the following: a request to enroll the at least one customer in at least one incentive program associated with the identified merchant, a request to modify the at least one current transaction, or any combination thereof; receive an authorization response message after communicating the authorization request message; and at least one of the following: automatically enroll the at least one customer in the at least one incentive program, automatically modify the at least one current transaction, or any combination thereof.

In one non-limiting embodiment or aspect, the at least one server computer is programmed and/or configured to: receive current transaction data associated with at least one current transaction of the at least one customer with at least one other merchant; determine the loyalty segment of the at least one customer based at least partially on the current transaction data; and communicate, in response to the determination, a targeted message to a mobile device of the at least one customer, wherein the targeted messages causes the mobile device of the at least one customer to automatically display at least one of the following: a redemption offer data associated with the identified merchant, program data associated with a merchant loyalty program associated with the identified merchant, or any combination thereof.

In one non-limiting embodiment or aspect, the plurality of transactions is between a plurality of customers and the plurality of merchants, the plurality of customers including the at least one customer, wherein the at least one server computer is programmed and/or configured to: determine the identified merchant engagement level of each customer of the plurality of customers with respect to the at least one peer merchant based at least partially on the transaction data; determine the peer merchant engagement level of each customer of the plurality of customers with respect to the at least one peer merchant based at least partially on the transaction data; segment the plurality of customers into a plurality of loyalty segments based at least partially on the identified merchant engagement level of each customer of the plurality of customers and the peer merchant engagement level of each customer of the plurality of customers.

In one non-limiting embodiment or aspect, the at least one server computer is programmed and/or configured to: identify the at least one peer merchant associated with the identified merchant based at least partially on the transaction data.

In one non-limiting embodiment or aspect, the at least one server computer is programmed and/or configured to: compare a probability of the plurality of customers having at least one transaction at the identified merchant without having a transaction with at least one other merchant of the plurality of merchants to a probability of the plurality of customers having at least one transaction at the identified merchant and having at least one transaction at the at least one other merchant of the plurality of merchants to determine a peer level between the identified merchant and the at least one other merchant; and identify the at least one peer merchant as including the at least one other merchant if the peer level between the identified merchant and the at least one other merchant meets or exceeds a threshold level.

In one non-limiting embodiment or aspect, the at least one server computer is programmed and/or configured to: determine customer attributes associated with the plurality of customers based at least partially on the transaction data, wherein the customer attributes include at least one of the following: an amount spent by a customer at a merchant over a period of time, a number of transactions by the customer at the merchant over the period of time, an average amount spent per transaction by the customer at the merchant over the period of time, an average amount of time between transactions and/or since a last transaction by the customer at the merchant over the period of time, a number of other merchants at which the customer has transactions over the period of time, or any combination thereof, wherein the identified merchant engagement level of each customer is determined based at least partially on the customer attributes associated with that customer for the identified merchant, and wherein the peer merchant engagement level of each customer is determined based at least partially on the customer attributes associated with that customer for the at least one peer merchant.

In one non-limiting embodiment or aspect, the at least one server computer is programmed and/or configured to: compare, for each customer of the plurality of customers, the identified merchant engagement level of that customer and the peer merchant engagement level of that customer to at least one threshold level to segment the plurality of customers into the plurality of loyalty segments.

In one non-limiting embodiment or aspect, each of the plurality of loyalty segments indicates a probability that a subset of customers in that segment is at least one of the following: loyal to the identified merchant, willing switch from the at least one peer merchant to the identified merchant, disengaged from the identified merchant, disengaged from a specific type of transaction associated with the identified merchant, or any combination thereof.

In one non-limiting embodiment or aspect, the at least one server computer is programmed and/or configured to: segment the plurality of customers into one of an identified merchant high engagement band, an identified merchant moderate engagement band, and an identified merchant low engagement band based at least partially on the identified merchant engagement level of each customer; segment the plurality of customers into one of a peer merchant high engagement band, a peer merchant moderate engagement band, and a peer merchant low engagement band based at least partially on the peer merchant engagement level of each customer.

In one non-limiting embodiment or aspect, the at least one server computer is programmed and/or configured to: compare the identified merchant high engagement band, the identified merchant moderate engagement band, and the identified merchant low engagement band against the peer merchant high engagement band, the peer merchant moderate engagement band, and the peer merchant low engagement band to segment the plurality of customers into the plurality of loyalty segments.

In one non-limiting embodiment or aspect, the at least one server computer is programmed and/or configured to: segment a customer of the plurality of customers into a first segment of the plurality of loyalty segments based at least partially on a determination that the customer is: i) segmented in the identified merchant high engagement band and segmented outside the peer merchant high engagement band or ii) segmented in the identified merchant moderate engagement band and segmented in the peer merchant low engagement band; segment the customer of the plurality of customers into a second segment of the plurality of loyalty segments based at least partially on a determination that the customer is: i) segmented in the identified merchant high engagement band and segmented in the peer merchant high engagement band or ii) segmented in the identified merchant moderate engagement band and segmented outside the peer merchant low engagement band; segment the customer of the plurality of customers into a third segment of the plurality of loyalty segments based at least partially on a determination that the customer is segmented in the identified merchant low engagement band and segmented outside the peer merchant low engagement band; and segment the customer of the plurality of customers into a fourth segment of the plurality of loyalty segments based at least partially on a determination that the customer is segmented in the identified merchant low engagement band and segmented in the peer merchant low engagement band.

In one non-limiting embodiment or aspect, the at least one server computer is programmed and/or configured to: apply at least one rule based at least partially on at least one identified merchant objective to at least one target subset of customers in at least one target segment of the plurality of loyalty segments to identify at least one focus subset of customers of the plurality of customers.

In one non-limiting embodiment or aspect, the at least one rule is based at least partially on geographic locations of the plurality of customers, ages of the plurality of customers, incomes of the plurality of customers, or any combination thereof.

In one non-limiting embodiment or aspect, each customer of the at least one focus subset of customers is associated with a same at least one of the following: geographic location, age range, income range, or any combination thereof.

In one non-limiting embodiment or aspect, the at least one identified merchant objective indicates at least the at least one target segment to which the at least one rule is applied.

In one non-limiting embodiment or aspect, the at least one server computer is programmed and/or configured to: determine a profile of the at least one focus subset of customers based at least partially on the transaction data associated with the at least one subset of customers.

In one non-limiting embodiment or aspect, the at least one server computer is programmed and/or configured to: identify at least one other merchant of the plurality of merchants based at least partially on the profile of the at least one subset of customers; automatically enroll the at least one subset of customers in at least one incentive program associated with the at least one other merchant.

In one non-limiting embodiment or aspect, the target action comprises automatically enrolling the at least one customer of the plurality of customers in an incentive program based at least partially on the loyalty segment in which the at least one customer is segmented.

In one non-limiting embodiment or aspect, the target action comprises automatically modifying a current transaction of the at least one customer of the plurality of customers based at least partially on the loyalty segment in which the at least one customer is segmented.

In one non-limiting embodiment or aspect, the at least one server computer is programmed and/or configured to: receive current transaction data associated with at least one current transaction of the at least one customer with at least one other merchant; determine the loyalty segment in which the at least one customer is segmented based at least partially on the current transaction data; and communicate, in response to the determination, an authorization request message to the at least one merchant, wherein the authorization request message includes at least one of the following: a request to enroll the at least one customer in at least one incentive program associated with the identified merchant, a request to modify the at least one current transaction, or any combination thereof; receive an authorization response message after communicating the authorization request message; and at least one of the following: automatically enroll the at least one customer in the at least one incentive program, automatically modify the at least one current transaction, or any combination thereof.

In one non-limiting embodiment or aspect, the at least one server computer is programmed and/or configured to: receive current transaction data associated with at least one current transaction of the at least one customer with at least one other merchant; determine the loyalty segment in which the at least one customer is segmented based at least partially on the current transaction data; and communicate, in response to the determination, a targeted message to a mobile device of the at least one customer, wherein the targeted messages causes the mobile device of the at least one customer to automatically display at least one of the following: a redemption offer data associated with the identified merchant, program data associated with a merchant loyalty program associated with the identified merchant, or any combination thereof.

According to a non-limiting embodiment or aspect, provided is a computer program product for modeling customer behavior in a behavior-monitored system, the computer program product comprising at least one non-transitory computer-readable medium including program instructions that, when executed by at least one processor cause the at least one processor to: receive current transaction data associated with at least one current transaction of the at least one customer with at least one other merchant; determine the loyalty segment of the at least one customer based at least partially on the current transaction data; and communicate, in response to the determination, an authorization request message to the at least one merchant, wherein the authorization request message includes at least one of the following: a request to enroll the at least one customer in at least one incentive program associated with the identified merchant, a request to modify the at least one current transaction, or any combination thereof; receive an authorization response message after communicating the authorization request message; and at least one of the following: automatically enroll the at least one customer in the at least one incentive program, automatically modify the at least one current transaction, or any combination thereof.

Further embodiments or aspects are set forth in the following numbered clauses:

Clause 1. A computer-implemented method for modeling customer behavior in a behavior-monitored system, the computer-implemented method comprising: determining, with at least one processor, an identified merchant engagement level of at least one customer with respect to an identified merchant of a plurality of merchants based at least partially on transaction data associated with a plurality of transactions between the at least one customer and the plurality of merchants, wherein the identified merchant of the plurality of merchants is associated with at least one peer merchant of the plurality of merchants; determining, with at least one processor, a peer merchant engagement level of the at least one customer with respect to the at least one peer merchant based at least partially on the transaction data; determining, with at least one processor, a loyalty segment of the at least one customer based at least partially on the identified merchant engagement level of the at least one customer and the peer merchant engagement level of the at least one customer; and automatically initiating, or causing the initiation of, with at least one processor, a target action associated with the identified merchant with respect to the at least one customer based at least partially on the loyalty segment of the at least one customer.

Clause 2. The computer-implemented method of clause 1, further comprising: identifying, with at least one processor, the at least one peer merchant associated with the identified merchant based at least partially on the transaction data.

Clause 3. The computer implemented method of clause 1 or 2, further comprising: identifying, with at least one processor, the at least one peer merchant as including at least one other merchant of the plurality of merchants if the at least one customer initiates a transaction at the at least one other merchant and a transaction at the at least one peer merchant.

Clause 4. The computer-implemented method of any of clauses 1-3, further comprising: determining, with at least one processor, customer attributes associated with the at least one customer based at least partially on the transaction data, wherein the customer attributes include at least one of the following: an amount spent by the at least one customer at a merchant over a period of time, a number of transactions by the at least one customer at the merchant over the period of time, an average amount spent per transaction by the at least one customer at the merchant over the period of time, an average amount of time between transactions and/or since a last transaction by the at least one customer at the merchant over the period of time, a number of other merchants at which the at least one customer has transactions over the period of time, or any combination thereof, wherein the identified merchant engagement level of the at least one customer is determined based at least partially on the customer attributes associated with the at least one customer for the identified merchant, and wherein the peer merchant engagement level of the at least one customer is determined based at least partially on the customer attributes associated with the at least one customer for the at least one peer merchant.

Clause 5. The computer-implemented method of any of clauses 1-4, wherein determining the loyalty segment of the at least one customer further comprises comparing, the identified merchant engagement level of the at least one customer and the peer merchant engagement level of the at least one customer to at least one threshold level.

Clause 6. The computer-implemented method of any of clauses 1-5, wherein the loyalty segment indicates a probability that the at least one customer is at least one of the following: loyal to the identified merchant, willing switch from the at least one peer merchant to the identified merchant, disengaged from the identified merchant, disengaged from a specific type of transaction associated with the identified merchant, or any combination thereof.

Clause 7. The computer-implemented method of any of clauses 1-6, further comprising: classifying, with at least one processor, the at least one customer into one of an identified merchant high engagement band, an identified merchant moderate engagement band, and an identified merchant low engagement band based at least partially on the identified merchant engagement level of the at least one customer; classifying, with at least one processor, the at least one customer into one of a peer merchant high engagement band, a peer merchant moderate engagement band, and a peer merchant low engagement band based at least partially on the peer merchant engagement level of the at least one customer.

Clause 8. The computer-implemented method of any of clauses 1-7, further comprising: comparing, with at least one processor, the identified merchant high engagement band, the identified merchant moderate engagement band, and the identified merchant low engagement band against the peer merchant high engagement band, the peer merchant moderate engagement band, and the peer merchant low engagement band to determine the loyalty segment of the at least one customer.

Clause 9. The computer-implemented method of any of clauses 1-8, further comprising: classifying, with at least one processor, the at least one customer into a first loyalty segment based at least partially on a determination that the at least one customer is: i) classified in the identified merchant high engagement band and classified outside the peer merchant high engagement band or ii) classified in the identified merchant moderate engagement band and classified in the peer merchant low engagement band; classifying, with at least one processor, the at least one customer into a second loyalty segment based at least partially on a determination that the at least one customer is: i) classified in the identified merchant high engagement band and classified in the peer merchant high engagement band or ii) classified in the identified merchant moderate engagement band and classified outside the peer merchant low engagement band; classifying, with at least one processor, the at least one customer into a third loyalty segment based at least partially on a determination that the at least one customer is classified in the identified merchant low engagement band and classified outside the peer merchant low engagement band; and classifying, with at least one processor, the at least one customer into a fourth loyalty segment based at least partially on a determination that the at least one customer is classified in the identified merchant low engagement band and classified in the peer merchant low engagement band.

Clause 10. The computer-implemented method of any of clauses 1-9, wherein the target action comprises automatically enrolling, with at least one processor, the at least one customer in an incentive program based at least partially on the loyalty segment of the at least one customer.

Clause 11. The computer-implemented method of any of clauses 1-10, wherein the target action comprises automatically modifying, with at least one processor, a current transaction of the at least one customer based at least partially on the loyalty segment of the at least one customer.

Clause 12. The computer-implemented method of any of clauses 1-11, further comprising: receiving, with at least one processor, current transaction data associated with at least one current transaction of the at least one customer with at least one other merchant; determining, with at least one processor, the loyalty segment of the at least one customer based at least partially on the current transaction data; and communicating, in response to the determination, an authorization request message to the at least one merchant, wherein the authorization request message includes at least one of the following: a request to enroll the at least one customer in at least one incentive program associated with the identified merchant, a request to modify the at least one current transaction, or any combination thereof; receiving, with at least one processor, an authorization response message after communicating the authorization request message; and with the at least one processor, at least one of the following: automatically enrolling the at least one customer in the at least one incentive program, automatically modifying the at least one current transaction.

Clause 13. The computer-implemented method of any of clauses 1-12, further comprising: receiving, with at least one processor, current transaction data associated with at least one current transaction of the at least one customer with at least one other merchant; determining, with at least one processor, the loyalty segment of the at least one customer based at least partially on the current transaction data; and communicating, in response to the determination, a targeted message to a mobile device of the at least one customer, wherein the targeted messages causes the mobile device of the at least one customer to automatically display at least one of the following: a redemption offer data associated with the identified merchant, program data associated with a merchant loyalty program associated with the identified merchant, or any combination thereof.

Clause 14. The computer-implemented method of any of clauses 1-13, wherein the plurality of transactions is between a plurality of customers and the plurality of merchants, the plurality of customers including the at least one customer, the method further comprising: determining, with at least one processor, the identified merchant engagement level of each customer of the plurality of customers with respect to the at least one peer merchant based at least partially on the transaction data; determining, with at least one processor, the peer merchant engagement level of each customer of the plurality of customers with respect to the at least one peer merchant based at least partially on the transaction data; segmenting, with at least one processor, the plurality of customers into a plurality of loyalty segments based at least partially on the identified merchant engagement level of each customer of the plurality of customers and the peer merchant engagement level of each customer of the plurality of customers.

Clause 15. The computer-implemented method of any of clauses 1-14, further comprising: identifying, with at least one processor, the at least one peer merchant associated with the identified merchant based at least partially on the transaction data.

Clause 16. The computer-implemented method of any of clauses 1-15, further comprising: comparing, with at least one processor, a probability of the plurality of customers having at least one transaction at the identified merchant without having a transaction with at least one other merchant of the plurality of merchants to a probability of the plurality of customers having at least one transaction at the identified merchant and having at least one transaction at the at least one other merchant of the plurality of merchants to determine a peer level between the identified merchant and the at least one other merchant; and identifying, with at least one processor, the at least one peer merchant as including the at least one other merchant if the peer level between the identified merchant and the at least one other merchant meets or exceeds a threshold level.

Clause 17. The computer-implemented method of any of clauses 1-16, further comprising: determining, with at least one processor, customer attributes associated with the plurality of customers based at least partially on the transaction data, wherein the customer attributes include at least one of the following: an amount spent by a customer at a merchant over a period of time, a number of transactions by the customer at the merchant over the period of time, an average amount spent per transaction by the customer at the merchant over the period of time, an average amount of time between transactions and/or since a last transaction by the customer at the merchant over the period of time, a number of other merchants at which the customer has transactions over the period of time, or any combination thereof, wherein the identified merchant engagement level of each customer is determined based at least partially on the customer attributes associated with that customer for the identified merchant, and wherein the peer merchant engagement level of each customer is determined based at least partially on the customer attributes associated with that customer for the at least one peer merchant.

Clause 18. The computer-implemented method of any of clauses 1-17, wherein segmenting the plurality of customers into the plurality of loyalty segments further comprises comparing, for each customer of the plurality of customers, the identified merchant engagement level of that customer and the peer merchant engagement level of that customer to at least one threshold level.

Clause 19. The computer-implemented method of any of clauses 1-18, wherein each of the plurality of loyalty segments indicates a probability that a subset of customers in that segment is at least one of the following: loyal to the identified merchant, willing switch from the at least one peer merchant to the identified merchant, disengaged from the identified merchant, disengaged from a specific type of transaction associated with the identified merchant, or any combination thereof.

Clause 20. The computer-implemented method of any of clauses 1-19, further comprising: segmenting, with at least one processor, the plurality of customers into one of an identified merchant high engagement band, an identified merchant moderate engagement band, and an identified merchant low engagement band based at least partially on the identified merchant engagement level of each customer; segmenting, with at least one processor, the plurality of customers into one of a peer merchant high engagement band, a peer merchant moderate engagement band, and a peer merchant low engagement band based at least partially on the peer merchant engagement level of each customer.

Clause 21. The computer-implemented method of any of clauses 1-20, further comprising: comparing, with at least one processor, the identified merchant high engagement band, the identified merchant moderate engagement band, and the identified merchant low engagement band against the peer merchant high engagement band, the peer merchant moderate engagement band, and the peer merchant low engagement band to segment the plurality of customers into the plurality of loyalty segments.

Clause 22. The computer-implemented method of any of clauses 1-21, further comprising: segmenting, with at least one processor, a customer of the plurality of customers into a first segment of the plurality of loyalty segments based at least partially on a determination that the customer is: i) segmented in the identified merchant high engagement band and segmented outside the peer merchant high engagement band or ii) segmented in the identified merchant moderate engagement band and segmented in the peer merchant low engagement band; segmenting, with at least one processor, the customer of the plurality of customers into a second segment of the plurality of loyalty segments based at least partially on a determination that the customer is: i) segmented in the identified merchant high engagement band and segmented in the peer merchant high engagement band or ii) segmented in the identified merchant moderate engagement band and segmented outside the peer merchant low engagement band; segmenting, with at least one processor, the customer of the plurality of customers into a third segment of the plurality of loyalty segments based at least partially on a determination that the customer is segmented in the identified merchant low engagement band and segmented outside the peer merchant low engagement band; and segmenting, with at least one processor, the customer of the plurality of customers into a fourth segment of the plurality of loyalty segments based at least partially on a determination that the customer is segmented in the identified merchant low engagement band and segmented in the peer merchant low engagement band.

Clause 23. The computer-implemented method of any of clauses 1-22, further comprising: applying, with at least one processor, at least one rule based at least partially on at least one identified merchant objective to at least one target subset of customers in at least one target segment of the plurality of loyalty segments to identify at least one focus subset of customers of the plurality of customers.

Clause 24. The computer-implemented method of any of clauses 1-23, wherein the at least one rule is based at least partially on geographic locations of the plurality of customers, ages of the plurality of customers, incomes of the plurality of customers, or any combination thereof.

Clause 25. The computer-implemented method of any of clauses 1-24, wherein each customer of the at least one focus subset of customers is associated with a same at least one of the following: geographic location, age range, income range, or any combination thereof.

Clause 26. The computer-implemented method of any of clauses 1-25, wherein the at least one identified merchant objective indicates at least the at least one target segment to which the at least one rule is applied.

Clause 27. The computer-implemented method of any of clauses 1-26, further comprising: determining, with at least one processor, a profile of the at least one focus subset of customers based at least partially on the transaction data associated with the at least one subset of customers.

Clause 28. The computer-implemented method of any of clauses 1-27, further comprising: identifying, with at least one processor, at least one other merchant of the plurality of merchants based at least partially on the profile of the at least one subset of customers; automatically enrolling, with at least one processor, the at least one subset of customers in at least one incentive program associated with the at least one other merchant.

Clause 29. The computer-implemented method of any of clauses 1-28, wherein the target action comprises automatically enrolling, with at least one processor, the at least one customer of the plurality of customers in an incentive program based at least partially on the loyalty segment in which the at least one customer is segmented.

Clause 30. The computer-implemented method of any of clauses 1-29, wherein the target action comprises automatically modifying, with at least one processor, a current transaction of the at least one customer of the plurality of customers based at least partially on the loyalty segment in which the at least one customer is segmented.

Clause 31. The computer-implemented method of any of clauses 1-30, further comprising: receiving, with at least one processor, current transaction data associated with at least one current transaction of the at least one customer with at least one other merchant; determining, with at least one processor, the loyalty segment in which the at least one customer is segmented based at least partially on the current transaction data; and communicating, in response to the determination, an authorization request message to the at least one merchant, wherein the authorization request message includes at least one of the following: a request to enroll the at least one customer in at least one incentive program associated with the identified merchant, a request to modify the at least one current transaction, or any combination thereof; receiving, with at least one processor, an authorization response message after communicating the authorization request message; and with the at least one processor, at least one of the following automatically enrolling the at least one customer in the at least one incentive program, automatically modifying the at least one current transaction, or any combination thereof.

Clause 32. The computer-implemented method of any of clauses 1-31, further comprising: receiving, with at least one processor, current transaction data associated with at least one current transaction of the at least one customer with at least one other merchant; determining, with at least one processor, the loyalty segment in which the at least one customer is segmented based at least partially on the current transaction data; and communicating, in response to the determination, a targeted message to a mobile device of the at least one customer, wherein the targeted messages causes the mobile device of the at least one customer to automatically display at least one of the following: a redemption offer data associated with the identified merchant, program data associated with a merchant loyalty program associated with the identified merchant, or any combination thereof.

Clause 33. A system for modeling customer behavior in a behavior-monitored system, the system comprising at least one server computer including at least one processor, the at least one server computer programmed and/or configured to: determine an identified merchant engagement level of at least one customer with respect to an identified merchant of a plurality of merchants based at least partially on transaction data associated with a plurality of transactions between the at least one customer and the plurality of merchants, wherein the identified merchant of the plurality of merchants is associated with at least one peer merchant of the plurality of merchants; determine a peer merchant engagement level of the at least one customer with respect to the at least one peer merchant based at least partially on the transaction data; determine a loyalty segment of the at least one customer based at least partially on the identified merchant engagement level of the at least one customer and the peer merchant engagement level of the at least one customer; and automatically initiate, or cause the initiation of, with at least one processor, a target action associated with the identified merchant with respect to the at least one customer based at least partially on the loyalty segment of the at least one customer.

Clause 34. The system of clause 33, wherein the at least one server computer is programmed and/or configured to: identify the at least one peer merchant associated with the identified merchant based at least partially on the transaction data.

Clause 35. The system of clause 33 or 34, wherein the at least one server computer is programmed and/or configured to: identify the at least one peer merchant as including at least one other merchant of the plurality of merchants if the at least one customer initiates a transaction with the at least one other merchant and a transaction at the at least one peer merchant.

Clause 36. The system of any of clauses 3335, wherein the at least one server computer is programmed and/or configured to: determine customer attributes associated with the at least one customer based at least partially on the transaction data, wherein the customer attributes include at least one of the following: an amount spent by the at least one customer at a merchant over a period of time, a number of transactions by the at least one customer at the merchant over the period of time, an average amount spent per transaction by the at least one customer at the merchant over the period of time, an average amount of time between transactions and/or since a last transaction by the at least one customer at the merchant over the period of time, a number of other merchants at which the at least one customer has transactions over the period of time, or any combination thereof, wherein the identified merchant engagement level of the at least one customer is determined based at least partially on the customer attributes associated with the at least one customer for the identified merchant, and wherein the peer merchant engagement level of the at least one customer is determined based at least partially on the customer attributes associated with the at least one customer for the at least one peer merchant.

Clause 37. The system of any of clauses 33-36, wherein the at least one server computer is programmed and/or configured to: compare, the identified merchant engagement level of the at least one customer and the peer merchant engagement level of the at least one customer to at least one threshold level to determine the loyalty segment of the at least one customer.

Clause 38. The system of any of clauses 33-37, wherein the loyalty segment indicates a probability that the at least one customer is at least one of the following: loyal to the identified merchant, willing switch from the at least one peer merchant to the identified merchant, disengaged from the identified merchant, disengaged from a specific type of transaction associated with the identified merchant, or any combination thereof.

Clause 39. The system of any of clauses 33-38, wherein the at least one server computer is programmed and/or configured to: classify the at least one customer into one of an identified merchant high engagement band, an identified merchant moderate engagement band, and an identified merchant low engagement band based at least partially on the identified merchant engagement level of the at least one customer; classify the at least one customer into one of a peer merchant high engagement band, a peer merchant moderate engagement band, and a peer merchant low engagement band based at least partially on the peer merchant engagement level of the at least one customer.

Clause 40. The system of any of clauses 33-39, wherein the at least one server computer is programmed and/or configured to: compare the identified merchant high engagement band, the identified merchant moderate engagement band, and the identified merchant low engagement band against the peer merchant high engagement band, the peer merchant moderate engagement band, and the peer merchant low engagement band to determine the loyalty segment of the at least one customer.

Clause 41. The system of any of clauses 33-40, wherein the at least one server computer is programmed and/or configured to: classify the at least one customer into a first loyalty segment based at least partially on a determination that the at least one customer is: i) classified in the identified merchant high engagement band and classified outside the peer merchant high engagement band or ii) classified in the identified merchant moderate engagement band and classified in the peer merchant low engagement band; classify the at least one customer into a second loyalty segment based at least partially on a determination that the at least one customer is: i) classified in the identified merchant high engagement band and classified in the peer merchant high engagement band or ii) classified in the identified merchant moderate engagement band and classified outside the peer merchant low engagement band; classify the at least one customer into a third loyalty segment based at least partially on a determination that the at least one customer is classified in the identified merchant low engagement band and classified outside the peer merchant low engagement band; and classify the at least one customer into a fourth loyalty segment based at least partially on a determination that the at least one customer is classified in the identified merchant low engagement band and classified in the peer merchant low engagement band.

Clause 42. The system of any of clauses 33-41, wherein the target action comprises automatically enrolling the at least one customer in an incentive program based at least partially on the loyalty segment of the at least one customer.

Clause 43. The system of any of clauses 33-42, wherein the target action comprises automatically modifying a current transaction of the at least one customer based at least partially on the loyalty segment of the at least one customer.

Clause 44. The system of any of clause 33-43, wherein the at least one server computer is programmed and/or configured to: receive current transaction data associated with at least one current transaction of the at least one customer with at least one other merchant; determine the loyalty segment of the at least one customer based at least partially on the current transaction data; and communicate, in response to the determination, an authorization request message to the at least one merchant, wherein the authorization request message includes at least one of the following: a request to enroll the at least one customer in at least one incentive program associated with the identified merchant, a request to modify the at least one current transaction, or any combination thereof; receive an authorization response message after communicating the authorization request message; and at least one of the following: automatically enroll the at least one customer in the at least one incentive program, automatically modify the at least one current transaction, or any combination thereof.

Clause 45. The system of any of clauses 33-44, wherein the at least one server computer is programmed and/or configured to: receive current transaction data associated with at least one current transaction of the at least one customer with at least one other merchant; determine the loyalty segment of the at least one customer based at least partially on the current transaction data; and communicate, in response to the determination, a targeted message to a mobile device of the at least one customer, wherein the targeted messages causes the mobile device of the at least one customer to automatically display at least one of the following a redemption offer data associated with the identified merchant, program data associated with a merchant loyalty program associated with the identified merchant, or any combination thereof.

Clause 46. The system of any of clauses 33-45, wherein the plurality of transactions is between a plurality of customers and the plurality of merchants, the plurality of customers including the at least one customer, wherein the at least one server computer is programmed and/or configured to: determine the identified merchant engagement level of each customer of the plurality of customers with respect to the at least one peer merchant based at least partially on the transaction data; determine the peer merchant engagement level of each customer of the plurality of customers with respect to the at least one peer merchant based at least partially on the transaction data; segment the plurality of customers into a plurality of loyalty segments based at least partially on the identified merchant engagement level of each customer of the plurality of customers and the peer merchant engagement level of each customer of the plurality of customers.

Clause 47. The system of any of clauses 33-46, wherein the at least one server computer is programmed and/or configured to: identify the at least one peer merchant associated with the identified merchant based at least partially on the transaction data.

Clause 48. The system of any of clauses 33-47, wherein the at least one server computer is programmed and/or configured to: compare a probability of the plurality of customers having at least one transaction at the identified merchant without having a transaction with at least one other merchant of the plurality of merchants to a probability of the plurality of customers having at least one transaction at the identified merchant and having at least one transaction at the at least one other merchant of the plurality of merchants to determine a peer level between the identified merchant and the at least one other merchant; and identify the at least one peer merchant as including the at least one other merchant if the peer level between the identified merchant and the at least one other merchant meets or exceeds a threshold level.

Clause 49. The system of any of clauses 33-48, wherein the at least one server computer is programmed and/or configured to: determine customer attributes associated with the plurality of customers based at least partially on the transaction data, wherein the customer attributes include at least one of the following: an amount spent by a customer at a merchant over a period of time, a number of transactions by the customer at the merchant over the period of time, an average amount spent per transaction by the customer at the merchant over the period of time, an average amount of time between transactions and/or since a last transaction by the customer at the merchant over the period of time, a number of other merchants at which the customer has transactions over the period of time, or any combination thereof, wherein the identified merchant engagement level of each customer is determined based at least partially on the customer attributes associated with that customer for the identified merchant, and wherein the peer merchant engagement level of each customer is determined based at least partially on the customer attributes associated with that customer for the at least one peer merchant.

Clause 50. The system of any of clauses 33-49, wherein the at least one server computer is programmed and/or configured to: compare, for each customer of the plurality of customers, the identified merchant engagement level of that customer and the peer merchant engagement level of that customer to at least one threshold level to segment the plurality of customers into the plurality of loyalty segments.

Clause 51. The system of any of clauses 33-50, wherein each of the plurality of loyalty segments indicates a probability that a subset of customers in that segment is at least one of the following: loyal to the identified merchant, willing switch from the at least one peer merchant to the identified merchant, disengaged from the identified merchant, disengaged from a specific type of transaction associated with the identified merchant, or any combination thereof.

Clause 52. The system of any of clauses 33-51, wherein the at least one server computer is programmed and/or configured to: segment the plurality of customers into one of an identified merchant high engagement band, an identified merchant moderate engagement band, and an identified merchant low engagement band based at least partially on the identified merchant engagement level of each customer; segment the plurality of customers into one of a peer merchant high engagement band, a peer merchant moderate engagement band, and a peer merchant low engagement band based at least partially on the peer merchant engagement level of each customer.

Clause 53. The system of any of clauses 33-52, wherein the at least one server computer is programmed and/or configured to: compare the identified merchant high engagement band, the identified merchant moderate engagement band, and the identified merchant low engagement band against the peer merchant high engagement band, the peer merchant moderate engagement band, and the peer merchant low engagement band to segment the plurality of customers into the plurality of loyalty segments.

Clause 54. The system of any of clauses 33-53, wherein the at least one server computer is programmed and/or configured to: segment a customer of the plurality of customers into a first segment of the plurality of loyalty segments based at least partially on a determination that the customer is: i) segmented in the identified merchant high engagement band and segmented outside the peer merchant high engagement band or ii) segmented in the identified merchant moderate engagement band and segmented in the peer merchant low engagement band; segment the customer of the plurality of customers into a second segment of the plurality of loyalty segments based at least partially on a determination that the customer is: i) segmented in the identified merchant high engagement band and segmented in the peer merchant high engagement band or ii) segmented in the identified merchant moderate engagement band and segmented outside the peer merchant low engagement band; segment the customer of the plurality of customers into a third segment of the plurality of loyalty segments based at least partially on a determination that the customer is segmented in the identified merchant low engagement band and segmented outside the peer merchant low engagement band; and segment the customer of the plurality of customers into a fourth segment of the plurality of loyalty segments based at least partially on a determination that the customer is segmented in the identified merchant low engagement band and segmented in the peer merchant low engagement band.

Clause 55. The system of any of clauses 33-54, wherein the at least one server computer is programmed and/or configured to: apply at least one rule based at least partially on at least one identified merchant objective to at least one target subset of customers in at least one target segment of the plurality of loyalty segments to identify at least one focus subset of customers of the plurality of customers.

Clause 56. The system of any of clauses 33-55, wherein the at least one rule is based at least partially on geographic locations of the plurality of customers, ages of the plurality of customers, incomes of the plurality of customers, or any combination thereof.

Clause 57. The system of any of clauses 33-56, wherein each customer of the at least one focus subset of customers is associated with a same at least one of the following: geographic location, age range, income range, or any combination thereof.

Clause 58. The system of any of clauses 33-57, wherein the at least one identified merchant objective indicates at least the at least one target segment to which the at least one rule is applied.

Clause 59. The system of any of clauses 33-58, wherein the at least one server computer is programmed and/or configured to: determine a profile of the at least one focus subset of customers based at least partially on the transaction data associated with the at least one subset of customers.

Clause 60. The system of any of clauses 33-59, wherein the at least one server computer is programmed and/or configured to: identify at least one other merchant of the plurality of merchants based at least partially on the profile of the at least one subset of customers; automatically enroll the at least one subset of customers in at least one incentive program associated with the at least one other merchant.

Clause 61. The system of any of clauses 33-60, wherein the target action comprises automatically enrolling the at least one customer of the plurality of customers in an incentive program based at least partially on the loyalty segment in which the at least one customer is segmented.

Clause 62, The system of any of clauses 33-61, wherein the target action comprises automatically modifying a current transaction of the at least one customer of the plurality of customers based at least partially on the loyalty segment in which the at least one customer is segmented.

Clause 63. The system of any of clauses 33-62, wherein the at least one server computer is programmed and/or configured to: receive current transaction data associated with at least one current transaction of the at least one customer with at least one other merchant; determine the loyalty segment in which the at least one customer is segmented based at least partially on the current transaction data; and communicate, in response to the determination, an authorization request message to the at least one merchant, wherein the authorization request message includes at least one of the following: a request to enroll the at least one customer in at least one incentive program associated with the identified merchant, a request to modify the at least one current transaction, or any combination thereof; receive an authorization response message after communicating the authorization request message; and at least one of the following: automatically enroll the at least one customer in the at least one incentive program, automatically modify the at least one current transaction, or any combination thereof.

Clause 64. The system of any of clauses 33-63, wherein the at least one server computer is programmed and/or configured to: receive current transaction data associated with at least one current transaction of the at least one customer with at least one other merchant; determine the loyalty segment in which the at least one customer is segmented based at least partially on the current transaction data; and communicate, in response to the determination, a targeted message to a mobile device of the at least one customer, wherein the targeted messages causes the mobile device of the at least one customer to automatically display at least one of the following a redemption offer data associated with the identified merchant, program data associated with a merchant loyalty program associated with the identified merchant, or any combination thereof.

Clause 65. A computer program product for modeling customer behavior in a behavior-monitored system, the computer program product comprising at least one non-transitory computer-readable medium including program instructions that, when executed by at least one processor cause the at least one processor to: determine an identified merchant engagement level of at least one customer with respect to an identified merchant of a plurality of merchants based at least partially on transaction data associated with a plurality of transactions between the at least one customer and the identified merchant, wherein the identified merchant of the plurality of merchants is associated with at least one peer merchant of the plurality of merchants; determine a peer merchant engagement level of the at least one customer with respect to the at least one peer merchant based at least partially on the transaction data; determine a loyalty segment of the at least one customer based at least partially on the identified merchant engagement level of the at least one customer and the peer merchant engagement level of the at least one customer; and automatically initiate, or cause the initiation of, with at least one processor, a target action associated with the identified merchant with respect to the at least one customer.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the non-limiting embodiments or aspects that are illustrated in the accompanying schematic figures, in which:

FIG. 6 is a sequence diagram for modeling customer behavior in a behavior-monitored system according to principles of the present invention;

FIG. 7 is a graphical representation of example potentials of geographic locations to achieve a merchant objective of increased wallet share growth.

DESCRIPTION OF THE INVENTION

Figure 1:
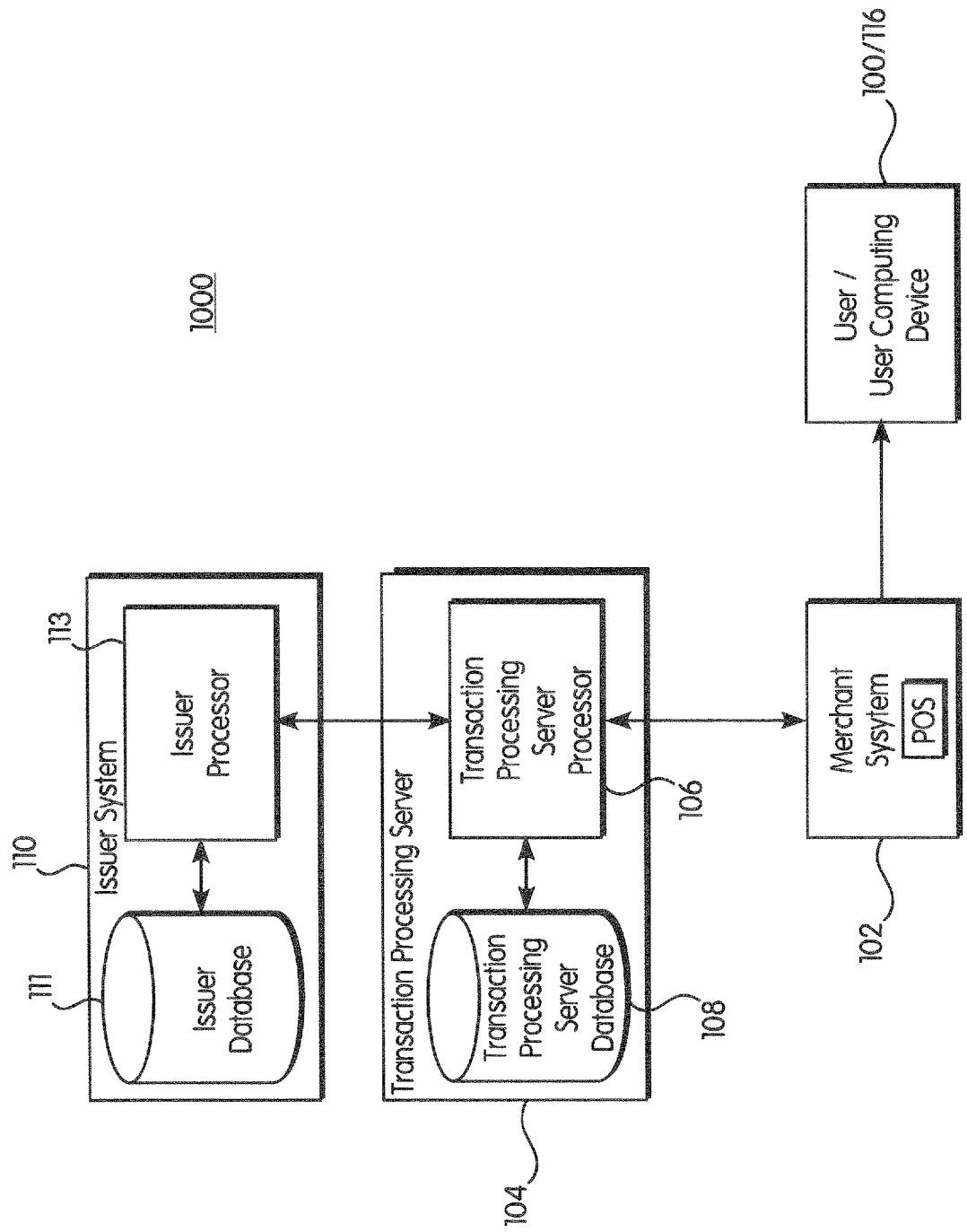
FIG. 1 is a schematic diagram of a system for modeling customer behavior in a behavior-monitored system according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step or step sequences, except where expressly specified to the contrary. It is also to be understood that the specific devices and processes illustrated in the attached drawings, and described in the following specification, are simply non-limiting embodiments or aspects of the invention. Hence, specific dimensions and other physical characteristics related to the non-limiting embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based at least partially on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay™, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The portable financial device may include a volatile or a non-volatile memory to store information, such as an account identifier or a name of the account holder.

As used herein, the term "payment gateway" may refer to a payment processing system operated by or on behalf of an entity that contracts with an acquirer institution to provide transaction service provider payment services to one or more merchants using portable financial devices managed by the transaction service provider.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present invention are directed to a method, system, and computer program product for modeling customer behavior in a behavior-monitored system. Non-limiting embodiments or aspects of the present invention allow for an automated intelligence framework that develops multiple customer level attributes from transaction data of customers, classifies and segments customers with respect to engagement and loyalty to merchants, and determines market landscape, business performance, and benchmarking for a merchant against the rest of a market, customer profiles, and demographic and/or geographic based market profiles. These features enable merchants to more precisely model customer behavior in markets, such as customer engagement with a merchant(s) and/or customer loyalty to a merchant(s), and more accurately target customers to achieve merchant objectives, such as increased penetration and growth, at a more granular customer demographic and/or geographic level. For example, customers can be analyzed to determine loyalty to merchants and markets, and customer loyalty can be analyzed against customer demographic and/or geographic information to more accurately target specific customer demographics and/or locations more likely increase merchant penetration and growth, such as locations and/or customer demographics including higher percentages of customers that are more likely to switch their spending to a particular merchant. These features further enable behavior-monitored systems and merchants to more accurately target customers with specific and automatic messages, marketing, and incentives and/or automatically enroll customers in specific incentive programs. For example, offers or incentives can be automatically provided to customers in specific customer demographics and/or locations identified as more likely to increase market penetration and/or growth for a merchant, which enables the merchant to avoid wasting money and time targeting customers less likely to increase market penetration and/or growth for the merchant.

Non-limiting embodiments or aspects of the present invention allow customers targeted for achieving a merchant objective to be automatically targeted with offers or incentives during a current transaction according to the merchant objective. For example, a customer conducting a transaction at a specific merchant or at a merchant identified as a partner merchant or a peer/competitor merchant to the specific merchant may be automatically targeted with offers or incentives related to the current transaction and/or future transactions at the specific merchant and/or its partner merchant. Non-limiting embodiments or aspects of the present invention allow for current or future transactions of customers targeted for achieving a merchant objective to be automatically modified according to the merchant objective. For example, a discount may be automatically applied to a transaction in the midst of the transaction being conducted between the customer and the merchant or its merchant partner, or the customer may be automatically flagged to receive a discount on a future transaction yet to be conducted at the merchant or its merchant partner.

Although non-limiting embodiments or aspects of the present invention are described herein primarily with respect to modeling behavior of a plurality of customers with respect to one another, (e.g., classifying or segmenting customers into loyalty segments based at least partially on one another's behavior, transaction data, and/or customer attributes, such as by ranking customers with respect to one another), non-limiting embodiments or aspects of the present invention are not limited thereto and may include modeling behavior of a plurality of customers individually without respect to one another, (e.g., classifying or segmenting each individual customer into a loyalty segment based solely on behavior, transaction data, and/or customer attributes associated with that individual customer, such as by classifying or segmenting an individual customer into a loyalty segment according to one or more predetermined thresholds), modeling behavior of a single customer with respect to other customers, (e.g., determining a loyalty segment of a single customer based at least partially on other customers' behavior, such as by ranking a single customer with respect to a predetermined ranking of customers), and modeling behavior of a single customer without respect to other customers, (e.g., determining a loyalty segment of a single customer based solely on behavior, transaction data, and/or customer attributes associated with that single customer, such as by classifying or segmenting a single customer into a loyalty segment according one or more predetermined thresholds).

Referring to FIG. 1, a non-limiting embodiment or aspect of a system 1000 for modeling customer behavior in a behavior-monitored system is shown. A customer or user 100 may be a holder of a portable financial device (e.g., an account holder) and use that portable financial device associated with a transaction service provider and issued by an issuer which may have an issuer system 110 operated by or on behalf of the issuer. The issuer system 110 may include an issuer processor 113 and an issuer database 111. The issuer system 110 may include multiple servers or systems, across which functions of the issuer system 110 can be distributed, the issuer processor 113 may include a single processor or multiple processors, and the issuer database 111 may be a single database or multiple databases. The customer or user 100 may use the portable financial device to initiate transactions with a merchant system 102 having a merchant point-of-sale (POS) system. In some non-limiting embodiments or aspects, the customer or user 100 may purchase goods or services from the merchant using the portable financial device and the merchant system 102 to guarantee payment of the goods or services.

With continued reference to FIG. 1, the transaction service provider may have a transaction processing server 104 operated by or on behalf of the transaction service provider. The transaction processing server 104 may include a transaction processing server processor 106 and a transaction service provider database 108. The transaction processing server processor 106 may include a single processor or multiple processors, and the transaction service provider database 108 may be a single database or multiple databases. It will be appreciated that the transaction processing server 104 may include further computers, processors, databases, and the like, as well as multiple servers or systems, across which functions of the transaction processing server 104 can be distributed.

With continued reference to FIG. 1, the merchant system 102 may communicate with the transaction processing server processor 106 to initiate further processing of a transaction between the merchant system 102 and the customer or user 100. This may be in the form of a transaction authorization request to request further processing of a transaction initiated with the portable financial device. The merchant system 102 may communicate transaction data to the transaction processing server processor 106. The transaction data may include transaction parameters associated with transactions initiated with the portable financial device of the customer or user 100. Non-limiting examples of transaction parameters include: primary account number (PAN), transaction amount, transaction date and time, conversion rate of currency, merchant type, acquiring institution country, PAN country, response code, merchant name/location, type of currency, and the like. Response code may refer to a successful approval/completion of a transaction, denial because card reported as lost or stolen, do not honor, partial approval, VIP approval (VIP program), amount exceeds maximum, insufficient funds, incorrect PIN, suspected fraud, activity amount exceeded, allowable number of PIN-entry tries exceeded, and the like. Other relevant response codes from the credit card issuer response codes may be included as the response code, where relevant. Further, it will be appreciated that these transaction parameters associated with transactions of the user 100 may be communicated to the transaction processing server processor 106, and may be stored in the transaction service provider database 108, for example, as transaction data in association with the customer or user 100.

The transaction processing server processor 106 may generate further transaction parameters and/or customer attributes based at least partially on the transaction parameters communicated to the transaction processing server processor 106 by the merchant system 102. The customer attributes may include at least one of the following: an amount spent by a customer at a merchant over a period of time, a number of transactions by the customer at the merchant over the period of time, an average amount spent per transaction by the customer at the merchant over the period of time, an average amount of time between transactions and/or since a last transaction by the customer at the merchant over the period of time, a number of other merchants at which the customer has transactions over the period of time, or any combination thereof. The transaction processing server processor 106 may store the further transaction parameters and/or customer attributes in the transaction service provider database 108, for example, as transaction data in association with the account holder or user 100.

In some non-limiting embodiments or aspects, the transaction service provider database 108 and the transaction data may include the following transaction data categories: travel and entertainment transactions, retail transactions, dining transactions, "everyday" spending transactions, or any combination thereof. For example, the transaction data may define for a customer or user 100 proportions of transactions in travel and entertainment transactions, retail transactions, dining transactions, and everyday spending transactions. Travel and entertainment category transactions may include transactions related to airlines, lodging, vehicle rental, entertainment and travel services, and the like. Retail category transactions may include transactions related to apparel and accessories, department stores, discount stores, general retail goods, electronics and home improvement stores, and the like. Dining category transactions may include transactions related to restaurants and quick service restaurants, and the like. Everyday spending category transactions may include transactions related to food and groceries, fuel, transportation, drugstores and pharmacies, and the like. Travel and entertainment transactions, retail transactions, and dining transactions may be defined as discretionary spending. Everyday spending transactions may be defined as non-discretionary spending. Any other metric may be included that is determined to be relevant for defining the purchasing or spending behavior of an account holder or user 100. In some non-limiting embodiments or aspects, the transaction service provider database 108 may include more narrowly defined transaction data categories, such as transaction data categories defined based at least partially on Merchant Category Classification (MCC) codes. MCC is used to classify a merchant by the type of goods or services the merchant provides. MCC codes can be assigned by merchant type, (e.g., one for hotels, one for office supply stores, one for coffee merchants, etc.), or by merchant name (e.g., 3000 for United Airlines).

The transaction service provider database 108 can further store personal information (e.g., name, age, gender, billing and/or mailing address including zip code, phone number, email address, social security number, driver's license number, marital status, occupation, country of origin, current location, etc.), and/or various financial information (e.g., credit score, credit score history, issuer bank, issuer bank address, bank account number, account identifier, monthly salary, yearly salary, account or card level, apps where account or card is used e.g., Uber, Lyft, Visa Checkout, etc.) about the customers or users 100, for example, as demographic and/or geographic data in association with the customers or users 100. For example, an age, income, and residential location may be stored in the transaction service provider database 108 in association with a customer or user 100. In some non-limiting embodiments or aspects, the transaction processing server processor 106 can determine customer demographic and/or geographic information, such as age, income, residential location, e-commerce usage, international travel frequency, everyday spending, affluence, and the like, based at least partially on other transaction parameters stored in the transaction processing server database 108. For example, income and/or age may be estimated based at least partially on the transaction behavior of the customer, with higher spending customers being estimated as having higher income and customers with higher proportions of transactions in certain transaction data categories, such as medical supplies, being estimated as being older. Ecommerce usage may indicate a proportion of transactions of a customer over a period of time that were conducted via ecommerce, e.g., Internet transactions. International travel frequency may be determined based at least partially on a proportion of transactions of a customer over a period of time that were conducted internationally. Affluence may indicate a proportion of transactions of a customer over a period of time in predetermined transaction data categories, such as luxury goods and fashion retail. The transaction service provider database 108 may be located at or remote from the transaction processing server 104.

The transaction processing server processor 106 may also be in communication with the issuer database 111 which, like the transaction service provider database 108, may include information about each customer or user 100. The issuer database 111 may be located at or remote from the issuer system 110. The issuer database 111 may include information about each customer or user 100 collected by the issuer server 104. Some of the information in the transaction service provider database 108 and the issuer database 111 may be duplicative.

As previously mentioned, the transaction service provider database 108 may comprise an enrollment database that include information about customers or users 100 that are enrolled in one or more incentive programs offered by the transaction service provider, issuing institution, the merchant, and/or another entity. Customers or users 100 not currently enrolled in a transaction service provider incentive program may be enrolled in a transaction service provider incentive program by being added to the enrollment database by the transaction processing server processor 106. The enrollment database may also include specific information regarding the incentive programs being offered, such as expiration dates, terms and conditions, etc.

Figure 2:
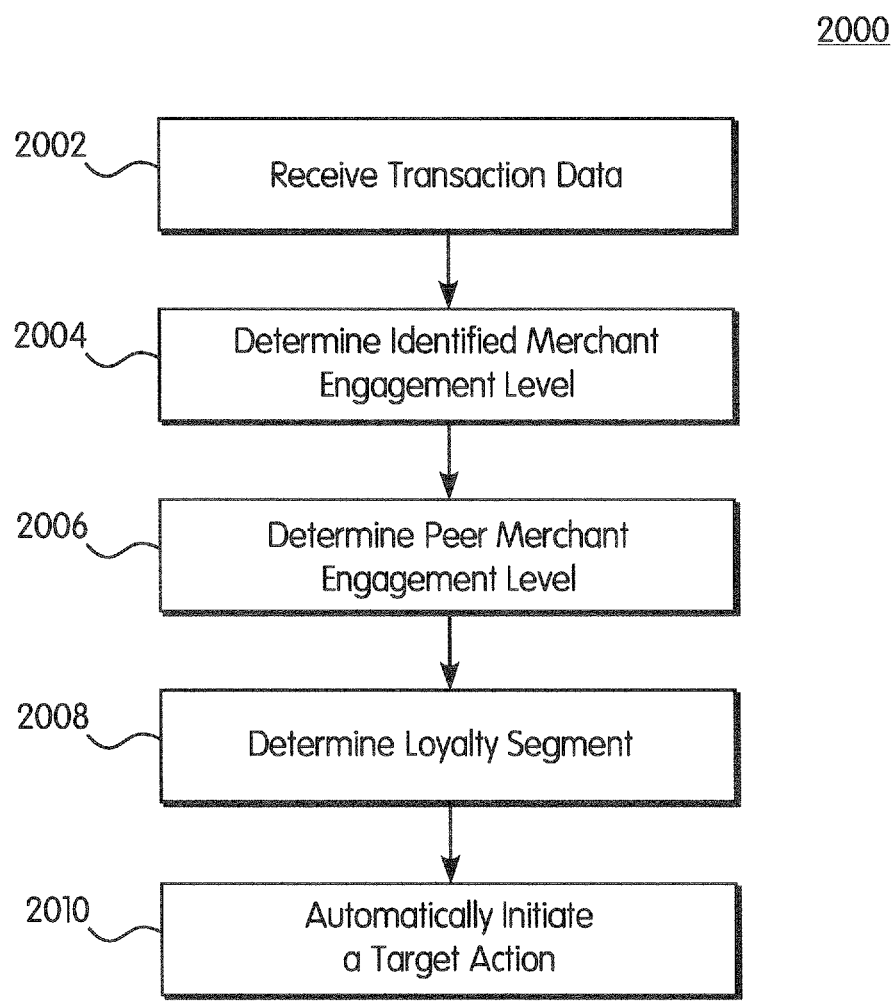
FIG. 2 is a flow diagram of a method for modeling customer behavior in a behavior-monitored system according to the principles of the present invention.

Referring to FIG. 2, a method 2000 is shown for modeling customer behavior in a behavior-monitored system. The method includes a step 2002 of receiving, with at least one processor, transaction data associated with a plurality of transactions between at least one customer and a plurality of merchants. At a step 2004, at least one processor determines an identified merchant engagement level of the at least one customer with respect to an identified merchant of the plurality of merchants based at least partially on the transaction data associated with the plurality of transactions between the at least one customer and the plurality of merchants, wherein the identified merchant of the plurality of merchants is associated with at least one peer merchant of the plurality of merchants. At a step 2006, at least one processor determines a peer merchant engagement level of the at least one customer with respect to the at least one peer merchant based at least partially on the transaction data. At a step 2008, at least one processor determines a loyalty segment of the at least one customer based at least partially on the identified merchant engagement level of the at least one customer and the peer merchant engagement level of the at least one customer. At a step 2010, at least one processor automatically initiates, or causes the initiation of, a target action associated with the identified merchant with respect to the at least one customer based at least partially on the loyalty segment of the at least one customer.

In one non-limiting embodiment or aspect, in method 2000, the plurality of transactions may be between a plurality of customers and the plurality of merchants, and the plurality of customers may include the at least one customer. For example, step 2004 may include determining, with at least one processor, the identified merchant engagement level of each customer of the plurality of customers with respect to the at least one peer merchant based at least partially on the transaction data. Step 2006 may include determining, with at least one processor, the peer merchant engagement level of each customer of the plurality of customers with respect to the at least one peer merchant based at least partially on the transaction data. Step 2008 may include segmenting, with at least one processor, the plurality of customers into a plurality of loyalty segments based at least partially on the identified merchant engagement level of each customer of the plurality of customers and the peer merchant engagement level of each customer of the plurality of customers.

With continued reference to FIG. 2, step 2002 may include determining, with at least one processor, customer attributes associated with the plurality of customers based at least partially on the transaction data, wherein the customer attributes may include at least one of the following: an amount spent by a customer at a merchant over a period of time, a number of transactions by the customer at the merchant over the period of time, an average amount spent per transaction by the customer at the merchant over the period of time, an average amount of time between transactions and/or since a last transaction by the customer at the merchant over the period of time, a number of other merchants at which the customer has transactions over the period of time, or any combination thereof, wherein the identified merchant engagement level of each customer is determined based at least partially on the customer attributes associated with that customer for the identified merchant, and wherein the peer merchant engagement level of each customer is determined based at least partially on the customer attributes associated with that customer for the at least one peer merchant. For example, referring also to FIG. 3, in which a method 3000 is shown for modeling customer behavior in a behavior-monitored system, step 2002 may include in a step 3002 the transaction processing server processor 106 receiving or retrieving the transaction data associated with the plurality of transactions between the plurality of customers or users 100 and the plurality of merchants 102, wherein the transaction data may include any of the transaction parameters described herein, personal information of the plurality of customers or users 100, financial information of the plurality of customers or users 100, and/or demographic and/or geographic data of the plurality of customers or users 100 from the transaction processing server database 108.

Figure 3:
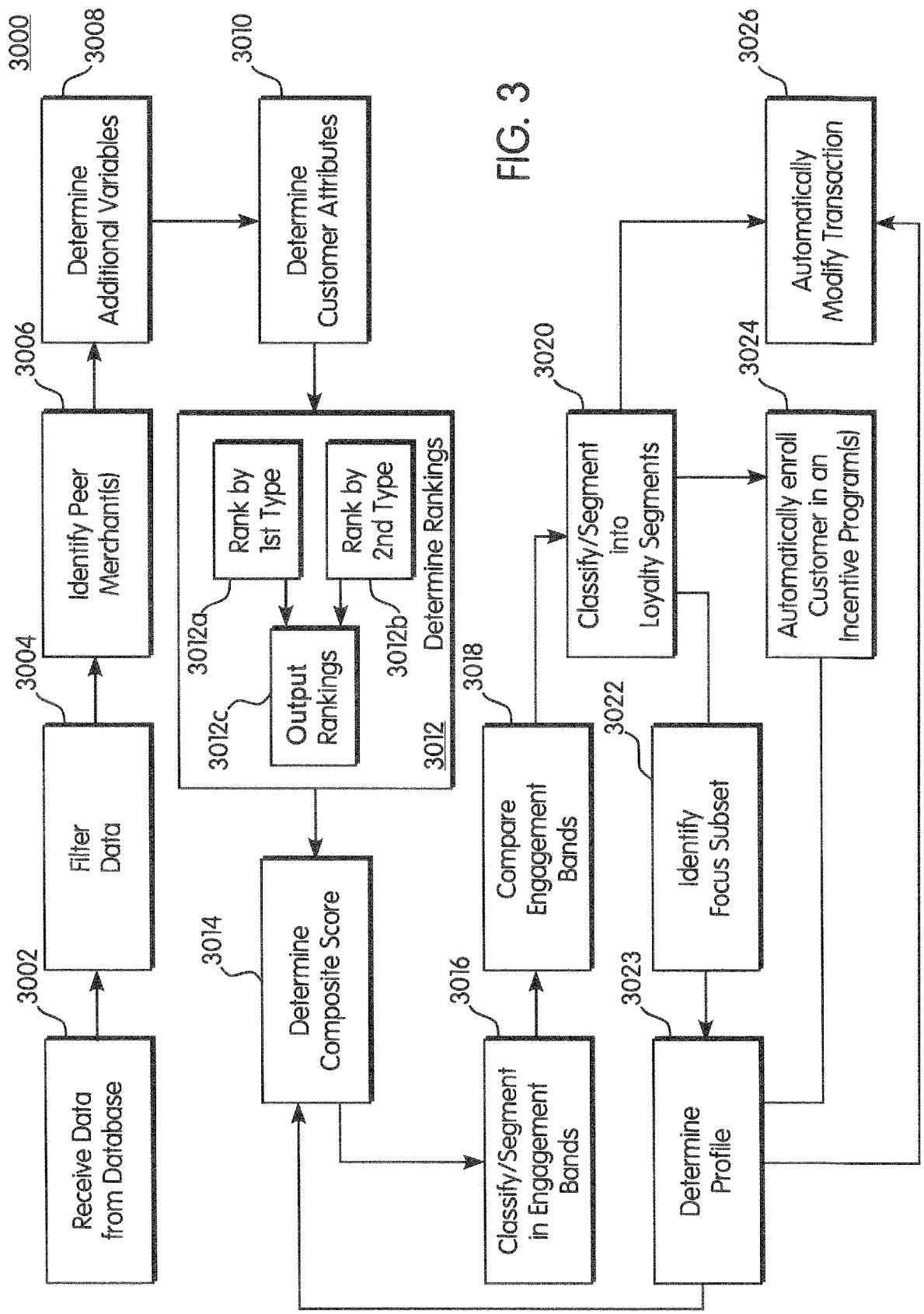
FIG. 3 is another flow diagram of a method for modeling customer behavior in a behavior-monitored system according to the principles of the present invention.

With continued referenced to FIGS. 2 and 3, step 2002 may include a step 3004 in which the transaction processing server processor 106 filters the transaction data. In some non-limiting embodiments or aspects, the plurality of customers or users 100 may include all customers or users 100 of the transaction service provider, or a subset of customers or users 100 of the transaction service provider. The subset of customers or users 100 may include any number of customers or users 100. The subset of customers or users 100 may be selected by the transaction processing server processor 106 based at least partially on the transaction data, the personal information, the financial information, the demographic and/or geographic data, the customer attributes, or any combination thereof. For example, the subset of customers or users 100 may be filtered to include only customers or users 100 located and/or having transactions in a specific geographic location(s), such as a country, city, etc., in which a merchant is located or interested in entering the market. In another non-limiting embodiment or example, the transaction processing server processor 106 may filter the transaction data for certain types of portable financial devices, e.g., debit cards and credit cards, having transactions in specific transaction data categories related to the identified merchant, e.g., a consumer products category for a coffee merchant.

With continued referenced to FIGS. 2 and 3, step 2002 may include a step 3006 of identifying, with at least one processor, the at least one peer merchant associated with the identified merchant based at least partially on the transaction data. The at least one processor may compare a probability of the plurality of customers having at least one transaction at the identified merchant without having a transaction with at least one other merchant of the plurality of merchants to a probability of the plurality of customers having at least one transaction at the identified merchant and having at least one transaction at the at least one other merchant of the plurality of merchants to determine a peer level between the identified merchant and the at least one other merchant. The at least one processor can identify the at least one peer merchant as including the at least one other merchant if the peer level between the identified merchant and the at least one other merchant meets or exceeds a threshold level. For example, the transaction processing server processor 106 may identify the at least one peer merchant according to the following Equation (1):

$$\text{Competition}(A, B) = \frac{P(A \mid B)}{P(A)} \quad (1)$$

where A is the identified merchant, B is another merchant, P(A|B) is the probability of the plurality of customers having at least one transaction at the identified merchant A and having at least one transaction at the another merchant B, P(A) is the probability of the plurality of customers having at least one transaction at the identified merchant A without having a transaction at the another merchant B, and for a Competition(A, B) (or lift) greater than 1, the another merchant B is determined as a competitor or peer merchant to the identified merchant A. A larger value of Competition (A, B) (or lift), indicates a stronger competitor. Identification of competitor or peer merchants may be restricted to desired geographic locations, e.g., a region or a country, and/or a desired payment channel.

With continued referenced to FIGS. 2 and 3, step 2002 may include a step 3008 of determining additional variables from the transaction data and formatting the additional variables to a desired or predetermined data format for processing. For example, the transaction processing server processor 106 may identify a first seen on or first used date of the portable financial devices of the plurality of customers or users 100 in the transaction data and/or transaction data categories of transactions of the plurality of customers or users 100 in the transaction data. The first seen on or first used date can be used to normalize the transaction data of the plurality of customers or users to a same scale. However, non-limiting embodiments or aspects are not limited thereto and other additional variables, such as an activation date of the portable financial devices, a frequency of use of the portable financial devices, and the like can be determined and used to normalize the transaction data of the plurality of customers or users to the same scale.

With continued reference to FIGS. 2 and 3, step 2002 may include a step 3010 of determining, with at least one processor, the customer attributes for the plurality of customers. For example, the transaction processing server processor 106 can summarize or associate the transaction data, the personal information, the financial information, and/or the demographic and/or geographic data and any additionally tagged variables, such as the first seen on or first used date, with each of the plurality of customers or users 100, e.g., at an account holder level. The transaction processing server processor 106 calculates the customer attributes for each customer or user 100 based at least partially on the transaction data and the additionally identified variables. For example, the transaction processing server processor 106 can determine at least one of the following customer attributes from the transaction data and the additionally identified variables: an amount spent by a customer at a merchant over a period of time (or since the first seen on or first used date if the period of time extends past that date), a number of transactions by the customer at the merchant over the period of time, an average amount spent per transaction by the customer at the merchant over the period of time, an average amount of time between transactions and/or since a last transaction by the customer at the merchant over the period of time, a number of other merchants at which the customer has transactions over the period of time, or any combination thereof. The transaction processing server processor 106 can determine the customer attributes for each customer or user 100 of the plurality of customers or users 100 with respect to the identified merchant, the at least one peer merchant, a plurality of peer merchants, each individual merchant of the plurality of peer merchants, an overall market, e.g., all merchants or all merchants in a transaction data category, or any combination thereof. For example, for the customer attribute of an amount spent by a customer at a merchant over a period of time, the transaction processing server processor 106 calculates the amount spent at the merchant over the period of time by the customer or user 100, and this customer attribute of an amount spent by a customer at a merchant over a period of time can be determined with respect to any individual merchant or group of merchants. For example, the transaction processing server processor 106 can determine the customer attributes with respect to the identified merchant and the at least one peer merchant. In some non-limiting embodiments or aspects, the at least one peer merchant may comprise a peer group of merchants, e.g., a plurality of peer merchants considered as single peer merchant with respect to the identified merchant. The customer attributes may be normalized to a same scale.

The transaction processing server processor 106 can associate the customer attributes for each customer or user 100 with one or more additional attributes, e.g., a type of portable financial device used to conduct the transactions of the customer or user 100, based at least partially on the transaction data. The transaction processing server processor 106 can scale the customer attributes for a portable financial device having a shorter transaction history, e.g., a more recent first seen on or first used date, to that of a portable financial device that has a longer or scaled transaction history with respect to transaction data categories of transactions. For example, a portable financial device having 4 transactions in a transaction data category of coffee in a 3 month transaction history can be scaled to having 16 transactions in the transaction data category of coffee for a 12 month transaction history. The transaction processing server processor 106 can remove the outlier values from the scaled values of the transaction data and/or the customer attributes by capping the scaled values, e.g., by capping the scaled values on 99th percentile values.

With continued referenced to FIGS. 2 and 3, steps 2004 and 2006 may include a step 3012 of determining, for each customer, a ranking of that customer with respect to the other customers for each customer attribute. The transaction processing server processor 106 can determine the rankings of the plurality of customers or users 100 with respect to the identified merchant and the at least one peer merchant. For example, for the customer attribute of an amount spent by a customer at a merchant over a period of time, the plurality of customers or users 100 can be ranked from the customer or user 100 having the lowest amount spent at the merchant over the period of time to the customer or user 100 having the highest amount spent at the merchant over the period of time, and this customer attribute of an amount spent by a customer at a merchant over a period of time can be determined with respect to any individual merchant or group of merchants. The plurality of customers or users 100 can be similarly ranked according to any other customer attribute by ranking the customers or users 100 from the customer or user 100 having the lowest value for the customer attribute to the customer or user having the highest value for the customer attribute (or vice-versa from highest to lowest values). In some non-limiting embodiments or aspects, the transaction processing server processor 106 can determine for each customer or user 100, a ranking of that customer or user 100 with respect to the other customers or users 100 for each customer attribute according to each additional attribute. For example, referring to FIG. 3, in a step 3012a the transaction processing server processor 106 can determine for each customer or user 100, a ranking of that customer or user 100 with respect to the other customers or users 100 for each customer attribute for a first additional attribute, e.g., a first type of portable financial device used to conduct the transactions of the customer or user 100, such as a debit card, and in a step 3012b determine for each customer or user 100, a ranking of that customer or user 100 with respect to the other customers or users 100 for each customer attribute for a second additional attribute, e.g., a second type of portable financial device used to conduct the transactions of the customer or user 100, such as a credit card. In a step 3012c, the transaction processing server processor 106 can output and/or store the ranking according to the first type of portable financial device and the ranking according to the second type of portable financial device.

With continued referenced to FIGS. 2 and 3, steps 2004 and 2006 may include a step 3014 of determining, for each customer, a composite score of that customer with respect to the identified merchant and a composite score of that customer with respect to the at least one peer merchant. For example, the transaction processing server processor 106 can determine a composite score for each customer or user 100 based at least partially on two or more of the customer attributes for that customer or user 100 with respect to the identified merchant, and determine a composite score for each customer or user 100 based at least partially on two or more of the customer attributes for that customer or user 100 with respect to the at least one peer merchant. The composite scores may be normalized to a same scale. The transaction processing server processor 106 can combine the rankings for two or more customer attributes of a customer or user 100 with respect to the identified merchant, for example, by determining a mean of the rankings, to determine the composite score for the customer or user 100 with respect to identified merchant. Similarly, the transaction processing server processor 106 can combine the rankings for two or more customer attributes of a customer or user 100 with respect to the at least one peer merchant, for example, by determining a mean of the rankings, to determine the composite score for the customer or user 100 with respect to the at least one peer merchant. For example, for a customer or user 100 that has rankings of 90, 88, 70, 72, and 66 for customer attributes with respect to the at least one peer merchant, the transaction processing server processor 106 can determine a composite score of 77.2. With continued reference to FIG. 3, in some non-limiting embodiments or aspects, in step 3014, at least one processor may weight the rankings of the two or more customer attributes with respect to each other based at least partially on at least one previously determined composite score, e.g., using a feedback loop. For example, the transaction processing server processor 106 may use a feedback loop to weight more heavily the ranking(s) from the two or more customer attributes that provide more accurate results for at least one previously determined composite score. The transaction service provider 106 may iteratively perform at least one of the following: a sentiment analysis, a frequency analysis, an accuracy analysis, or any combination thereof, on the composite scores to determine an accuracy, a precision, a recall, and/or an F-score for those composite scores, and choose a weighting for each of the rankings of the two or more customer attributes that returns the highest accuracy, precision, recall, and/or F-score for use in determining an identified merchant engagement level and a peer merchant engagement level.

The transaction processing server processor 106 determines a composite ranking for each customer or user 100 with respect to the other customers or users 100 according to the composite scores of the plurality of customers or users 100. The transaction processing server processor 106 can determine, for each customer or user 100, a composite ranking of that customer or user 100 with respect to the identified merchant based at least partially on the composite scores with respect to the identified merchant and a composite ranking of that customer or user 100 with respect to the at least one peer merchant based at least partially on the composite scores with respect to the at least one peer merchant. The plurality of customers or users 100 are ranked from a customer or user 100 having the lowest composite score to a customer or user having the highest composite score. For example, a customer or user 100 that has a composite score of 78 with respect to the identified merchant can be ranked higher than another customer or user 100 that has a composite score of 72 with respect to the identified merchant.

Figure 4:
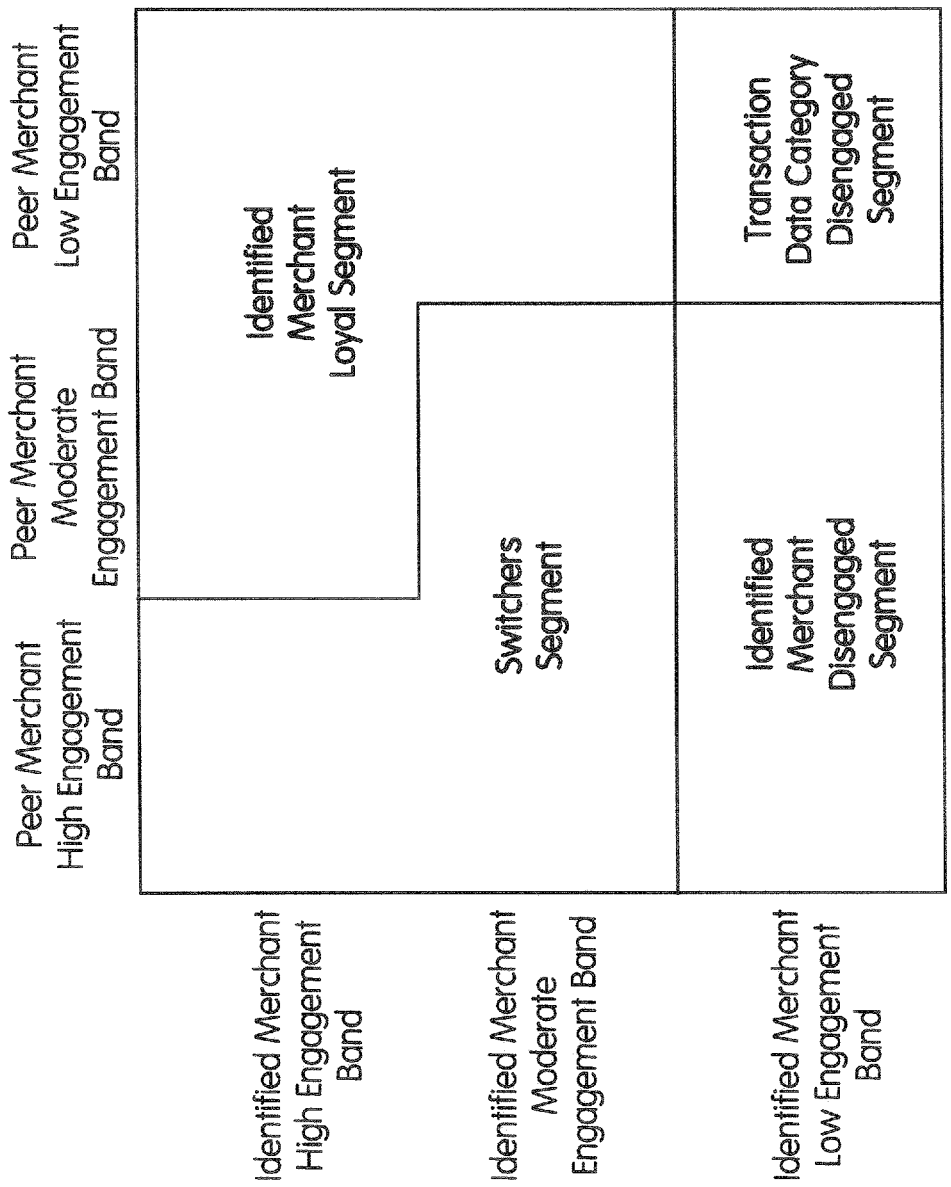
FIG. 4 is a graph plotting identified merchant engagement bands against peer merchant engagement bands according to the principles of the present invention.

With continued referenced to FIGS. 2 and 3, steps 2004 and 2006 may include a step 3016 in which the transaction processing server processor 106 classifies, segments, or buckets each customer or user 100 into one of a plurality of identified merchant engagement bands or buckets according to the composite score of that customer or user with respect to the identified merchant, and classifies, segments, or buckets each customer or user 100 into one of a plurality of peer merchant engagement bands or buckets according to the composite score of that customer or user with respect to the at least one peer merchant. In one non-limiting embodiment or aspect, as shown in FIG. 4, the plurality of customers or users 100 can be segmented into one of an identified merchant high engagement band, an identified merchant moderate engagement band, and an identified merchant low engagement band based at least partially on the identified merchant engagement level of each customer, and the plurality of customers or users 100 can be segmented into one of a peer merchant high engagement band, a peer merchant moderate engagement band, and a peer merchant low engagement based at least partially on the peer merchant engagement level of each customer. For example, customers or users 100 in a top third of the ranking of the composite scores can be segmented into a high engagement band, customers or users 100 in a middle third of the ranking of the composite scores can be segmented into a moderate engagement band, and customers or users in a lower third of the ranking of the composite scores can be bucketed into a low engagement band. In some non-limiting embodiments or aspects, an engagement level of a customer or user 100 with respect to the identified merchant (or the at least one peer merchant, includes the composite score of that customer or user 100 and/or the engagement band or bucket into which that customer or user 100 is segmented.

In another non-limiting embodiment or aspect, a customer or user 100 can be classified into one of an identified merchant high engagement band, an identified merchant moderate engagement band, and an identified merchant low engagement band based at least partially on the identified merchant engagement level of the at least one customer and classified into one of a peer merchant high engagement band, a peer merchant moderate engagement band, and a peer merchant low engagement band based at least partially on the peer merchant engagement level of the at least one customer. For example, the transaction processing server processor can apply one or more thresholds values to the composite score of the customer or user, e.g., without needing to rank the customer or user 100 with respect to any other users, to classify the customer or user 100 an identified merchant engagement band and to classify the customer or user 100 in a peer merchant engagement band. The one or more thresholds values may include any number of threshold values. The one or more threshold values may be set according to the normalized scale of a composite score to divide the normalized scale into a desired number of bands, e.g., for a composite score scaled to a value between 0 and 100, threshold values of 25, 50, and 75 can be used to classify the composite score into one of four engagement bands, which can vary from a band indicating a lowest engagement to a band indicating a highest engagement.

With continued referenced to FIGS. 2 and 3, step 2008 may include a step 3018 of comparing, for each customer of the plurality of customers, the identified merchant engagement level of that customer and the peer merchant engagement level of that customer to at least one threshold level. In a step 3020, the plurality of customers are classified or segmented into the plurality of loyalty segments based at least partially on the comparison. For example, the transaction processing server processor 106 can segment a customer or user 100 into one of the plurality of loyalty segments based at least partially on at least one of the following: a composite score for that for that customer or user 100 with respect to the identified merchant meets or exceeds the at least one threshold, a composite score for that for that customer or user 100 with respect to the at least one peer merchant meets or exceeds the at least one threshold, each composite score for that customer or user 100 meets or exceeds the at least one threshold, or any combination of the composite scores for that customer or user 100 meets or exceeds any combination of a plurality of thresholds.

In one nonlimiting embodiment or aspect, step 3018 may include comparing, with at least one processor, the identified merchant high engagement band, the identified merchant moderate engagement band, and the identified merchant low engagement band against the peer merchant high engagement band, the peer merchant moderate engagement band, and the peer merchant low engagement band. For example, in step 3020, the transaction processing server processor 106 can segment a customer into a first segment of the plurality of loyalty segments based at least partially on a determination that the customer is: i) segmented in the identified merchant high engagement band and segmented outside the peer merchant high engagement band or ii) segmented in the identified merchant moderate engagement band and segmented in the peer merchant low engagement band; segment the customer into a second segment of the plurality of loyalty segments based at least partially on a determination that the customer is: i) segmented in the identified merchant high engagement band and segmented in the peer merchant high engagement band or ii) segmented in the identified merchant moderate engagement band and segmented outside the peer merchant low engagement band; segment the customer into a third segment of the plurality of loyalty segments based at least partially on a determination that the customer is segmented and/or classified in the identified merchant low engagement band and segmented outside the peer merchant low engagement band; and segment the customer into a fourth segment of the plurality of loyalty segments based at least partially on a determination that the customer is segmented and/or classified in the identified merchant low engagement band and segmented in the peer merchant low engagement band.

Each of the plurality of loyalty segments may indicate a probability that a subset of customers in that segment is at least one of the following: loyal to the identified merchant, willing switch from the at least one peer merchant to the identified merchant, disengaged from the identified merchant, disengaged from a specific type of transaction associated with the identified merchant, or any combination thereof. For example, referring to FIG. 4, customers or users 100 segmented into the first segment of the plurality of loyalty segments may be customers or users 100 with a higher probability of being loyal to the identified merchant, e.g., customers or users 100 with a higher probability of conducting transactions in the related transaction data category and a higher probability of conducting all or a majority of the transactions in the related transaction data category at the identified merchant instead of the at least one peer merchant. Customers or users 100 segmented into the second segment of the plurality of loyalty segments may be customers or users 100 with a higher probability of being willing to switch from the at least one peer merchant to the identified merchant (or vice-versa), e.g., customers or users 100 with a higher probability of conducting transactions in the related transaction data category and a higher probability of conducting the transactions at the identified merchant and the at least one peer merchant. Customers segmented into the third segment of the plurality of loyalty segments may be customers that are disengaged from the identified merchant, e.g., customers with a higher probability of conducting transactions in the related transaction data category, but with a lower probability of conducting the transactions at the identified merchant. Customers segmented in the fourth segment of the plurality of loyalty segments may be customers that are disengaged from the specific type of transaction associated with the identified merchant, e.g., customers with a lower probability of conducting transactions in the related transaction data category, whether at the identified merchant or the at least one peer merchant. Although described mainly with respect to high, moderate and low engagement bands for the identified merchant and the at least one peer merchant, and first through fourth loyalty segments, non-limiting embodiments or aspects are not limited thereto and the customers or users 100 may be segmented into any number of engagement bands and segmented into any number of loyalty segments based at least partially on the engagement bands, wherein a greater number of engagement bands provides a greater level of granularity in indicating an engagement of the plurality of customers or users 100 to the identified merchant or the at least one peer merchant, and wherein a greater number of loyalty segments provides a greater level of granularity in indicating a loyalty of the plurality of customers or users 100 to the identified merchant or the at least one peer merchant.

With continued referenced to FIGS. 2 and 3, step 2010 may include a step 3022 of applying, with at least one processor, at least one rule based at least partially on at least one identified merchant objective to at least one target subset of customers in at least one target segment of the plurality of loyalty segments to identify at least one focus subset of customers of the plurality of customers. The at least one rule is based at least partially on geographic locations of the plurality of customers, ages of the plurality of customers, incomes of the plurality of customers, or any combination thereof. The at least one identified merchant objective may indicate at least the at least one target segment to which the at least one rule is applied. A merchant objective may be wallet share growth and/or increased penetration. A geographic location (or a specific customer demographic, e.g., age, income level, digital or ecommerce user, international traveler, and the like) may be evaluated for wallet share growth potential based at least partially on an amount of switchers penetration in the geographic location (or the customer demographic), a spend growth rate of the geographic location (or the customer demographic), a spend share of the geographic location (or the customer demographic), or any combination thereof. The geographic location (or the specific customer demographic) may be evaluated for increasing penetration based at least partially on an amount of disengaged penetration in the geographic location (or the customer demographic), a spend growth rate of the geographic location (or the customer demographic), a spend share of the geographic location (or the customer demographic), or any combination thereof.

An amount of switchers penetration may be determined based at least partially on a percentage of customers or users 100 with at least one transaction in the related transaction data category of the identified merchant, e.g., coffee for a coffee merchant, in a geographic location (or a customer demographic) benchmarked against the same metric for a larger geographic location that includes the geographic location, e.g., a locality in a city, (or a larger population of customers or users than that limited by the customer demographic). An amount of disengaged penetration may be determined based at least partially on a percentage of customer or users 100 without at least one transaction in the related transaction data category of the identified merchant in the geographic location (or the customer demographic) benchmarked against the same metric for the larger geographic location (or the larger population of customers or users than that limited by the customer demographic). A spend share may be determined based at least partially on a spend growth of the geographic location (or the customer demographic) in a time period, e.g., the past 12 months, benchmarked against the same metric for the larger geographic location (or the larger population of customers or users than that limited by the customer demographic). A share of spend may be determined based at least partially on a percentage contribution of the geographic location (or the customer demographic) to a total spend in the related transaction data category for the identified merchant in the larger geographic location (or the larger population of customers or users than that limited by the customer demographic).

Figure 5:
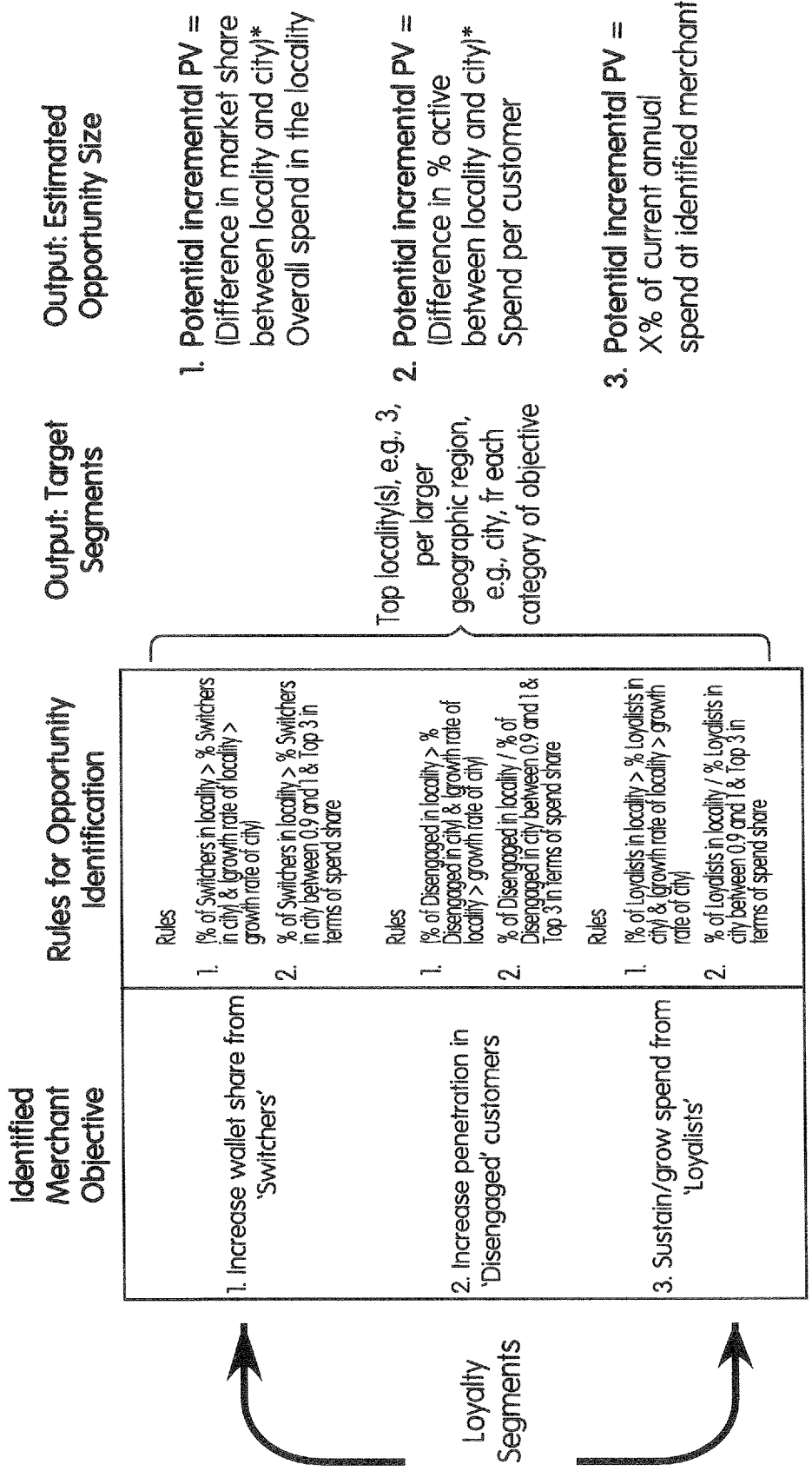
FIG. 5 is a flow diagram for identifying a focus subset of customers according to principles of the present invention.

For example, referring to FIG. 5, a merchant objective of the identified merchant may be directed to increasing a wallet share from customers in a switchers segment, increasing a penetration in customers in the identified merchant disengaged loyalty segment, sustaining and/or growing spending by customers in the identified merchant loyalty segments, and the like. Each customer of the at least one focus subset of customers may be associated with a same at least one of the following: geographic location, age range, income range, or any combination thereof. For example, for an identified merchant objective of increasing wallet share from customers in the switchers loyalty segment, the transaction processing server processor 106 can apply rules that identify a local geographic location(s), e.g., a locality or neighborhood, of a larger geographic area, e.g., a city or state, in which a percentage of customers that are in the switchers loyalty segment in the local geographic location is greater than a percentage of customers that are in the switchers loyalty segment in the larger geographic area, and a spend growth rate of the local geographic area is greater than a spend growth rate of the larger geographic location, and/or rules that identify a local geographic location(s) of the larger geographic location in which a percentage of customers in the local geographic location that are in the switchers loyalty segment divided by a percentage of customers that are in the larger geographic location and in the switchers loyalty segment is within a threshold value, e.g., a percentage of switchers in a locality divided by a percentage of switchers in a city between 0.9 and 1 and in a locality in the top 3 in in terms of market spend share. The transaction processing server processor 106 can determine an estimated opportunity size for the identified local geographic location(s) based at least partially on a difference in a market share between the local geographic location and the larger geographic location multiplied by an overall spend in the local geographic region.

With continued reference to FIG. 5, for an identified merchant objective of increasing penetration in an identified merchant disengaged segment, the transaction processing server processor 106 can apply rules that identify a local geographic location(s) of a larger geographic area in which a percentage of customers in the identified merchant disengaged segment is greater than a percentage of customers in the larger geographic location in the identified merchant disengaged segment and a spend growth rate of the local geographic location is greater than a spend growth rate of the larger geographic location, and/or rules that identify a local geographic location(s) of the larger geographic location in which a percentage of customers in the identified merchant disengaged segment divided by a percentage of customers in the larger geographic location in the identified merchant disengaged segment is within a threshold value, e.g., a percentage of disengaged customers in a locality divided by a percentage of disengaged customers in a city between 0.9 and 1 and in a locality in the top 3 in terms of market spend share. The transaction processing server processor 106 can determine an estimated opportunity size for the identified local geographic location(s) based at least partially on a difference in a percentage of disengaged customers between the local geographic location and the larger geographic location multiplied by an average spend per customer.

Still referring to FIG. 5, for an identified merchant objective of sustaining and/or growing spending by customers in an identified merchant loyal segment, the transaction processing server processor 106 can apply rules that identify a local geographic location(s) of a larger geographic area in which a percentage of customers in the identified merchant loyal segment is greater than a percentage of customers in the larger geographic location in the identified merchant loyal segment and a spend growth rate of the local geographic is greater than a spend growth rate of the larger geographic area, and/or rules that identify a local geographic location(s) of the larger geographic location in which a percentage of customers in the identified merchant loyal segment divided by a percentage of customers in the larger geographic location in the identified merchant loyal segment is within a threshold value, e.g., a percentage of loyal customers in a locality divided by a percentage of loyal customers in the city between 0.9 and 1 in a locality in the top 3 in terms of market spend share. The transaction processing server processor 106 can determine an estimated opportunity size for the identified local geographic location(s) based at least partially on a percentage of current annual spend at the identified merchant.

Referring again to FIGS. 2 and 3, in one non-limiting embodiment or aspect, step 2010 may include a step 3023 of determining, with at least one processor, a profile of the at least one focus subset of customers based at least partially on the transaction data associated with the at least one subset of customers. For example, the transaction processing server processor 106 can analyze the transaction data of the customers or users 100 in the identified local geographic location(s) to determine spend attributes of the customers or users 100, such as, locality names, digital engagement (e.g., a number of digital or ecommerce transactions), other shopping behavior (e.g., a frequency of transactions, an average amount of transactions, top transaction data categories), demographics (e.g., income bands and/or age bands), and the like, of the focus customer groups or segments in the identified localities. In one non-limiting embodiment or aspect, the transaction processing server processor 106 can identify at least one other merchant of the plurality of merchants based at least partially on the profile of the at least one subset of customers and automatically enroll the at least one subset of customers in at least one incentive program associated with the at least one other merchant. The transaction processing server processor 106 can determine a partner merchant based at least partially on transaction data categories in which the profiled customers have transactions other than the transaction data category of the identified merchant, (e.g., a merchant with customers having a substantially similar profile to the customers of the identified merchant, but that is not a peer merchant to the identified merchant), through which a promotion effort, such as an automatic enrollment in an incentive program associated with the identified merchant and/or the partner merchant, can be presented. For example, the incentive program may provide cross-benefits between the identified merchant and the partner merchant, such as spending at the identified merchant to receive an automatic discount at the partner merchant (or vice versa).

With continued referenced to FIGS. 2 and 3, step 2010 may include a step 3024 of automatically enrolling, with at least one processor, the at least one customer of the plurality of customers in an incentive program based at least partially on a loyalty segment in which the at least one customer is segmented and/or classified. For example, the target action may include the transaction processing server processor 106 automatically enrolling a customer or user 100 in at least one incentive program by communicating with the transaction service provider database 108, e.g., the enrollment database. The incentive program may include any program that provides a benefit to the customer or user 100. The benefit may be provided to the customer or user 100 contingent on past, present, or current use of their portable financial device(s). The benefit may be in the form of a discount, coupon, cash back, promotional item, sweepstakes, or any other incentive to the customer or user 100. The customer or user 100 may be entered into one or multiple incentive programs. The incentive program(s) may be a program associated with the transaction service provider, the issuer, the merchant, or any combination thereof. The transaction processing server processor 106 can select an incentive program(s) into which the customer or user 100 is automatically enrolled based at least partially on the loyalty segment in which the customer or user 100 is segmented, a focus subset of customers in which the customer or user 100 is identified, a profile of the focus subset of customers in which the customer or user 100 is identified, or any combination thereof. For example, the transaction processing server processor 106 may automatically enroll customers or users 100 in the focus subset of customers in a specific incentive program(s) developed for that focus subset of customers by the identified merchant to increase wallet share and/or penetration in that focus subset of customers.

In some non-limiting embodiments or aspects, automatically enrolling a customer or user 100 in the incentive program(s) may cause a benefit to be transmitted to a computing device 116, such as a mobile device, of the customer or user 100, such as but not limited to a voucher in an electronic wallet application. In other non-limiting embodiments or aspects, the transaction processing server processor 106 can generate and/or transmit a targeted communication to the computing device 116 of the customer or user 100. The communication may include information regarding use of their portable financial device, including the benefits of using the portable financial device at the identified merchant or a partner merchant thereof. The communication may also include an offer to enter at least one incentive program as described above. This communication may be sent in combination with automatically enrolling the customer or user 100 in an incentive program (e.g., a notification communication notifying the user 100 of enrollment in an incentive program). The communication may be automatically generated and sent to the computing device 116 of the user 100 by the transaction processing server processor 106. The communication may take any communication form, including a web-based communication, an email communication, a text message, a telephone call, a push notification, and/or an instant message. The user 100 may respond to the communication. A targeted offer may also include any other action directed to incentivizing, educating, or encouraging a customer or user 100 segmented in a loyalty segment to more frequently use their portable financial device at the identified merchant or a partner merchant thereof.

With continued referenced to FIGS. 2 and 3, step 2010 may include a step 3026 of automatically modifying, with at least one processor, a current transaction of the at least one customer of the plurality of customers based at least partially on a loyalty segment in which the at least one customer is segmented and/or classified. The transaction processing server processor 106 may receive current transaction data from the merchant system 102, which may be the identified merchant or a partner merchant thereof, for a transaction between a customer or user 100 and the merchant system 102 that is currently being processed by the merchant system 102, e.g., the merchant POS, and automatically apply a discount to the transaction based at least partially on the loyalty segment in which the customer or user 100 is segmented. For example, a customer or user 100 in the switchers segment of an identified merchant may be automatically given a discount on a transaction at the identified merchant to encourage the customer or user 100 to be more loyal to the identified merchant. In another non-limiting embodiment or aspect, the merchant system 102 can receive information indicating the loyalty segment in which the customer or user 100 is segmented and apply the discount to the transaction.

With continued reference to FIG. 3, in one non-limiting embodiment or aspect, steps 3024 and/or 3026 may include receiving, with at least one processor, current transaction data associated with at least one current transaction of the at least one customer with at least one other merchant; determining, with at least one processor, the loyalty segment in which the at least one customer is segmented and/or classified based at least partially on the current transaction data; and communicating, in response to the determination, an authorization request message to the at least one merchant, wherein the authorization request message includes at least one of the following: a request to enroll the at least one customer in at least one incentive program associated with the identified merchant, a request to modify the at least one current transaction, or any combination thereof; receiving, with at least one processor, an authorization response message after communicating the authorization request message; and with the at least one processor, at least one of the following: automatically enrolling the at least one customer in the at least one incentive program, automatically modifying the at least one current transaction, or any combination thereof. For example, the identified merchant may be associated with a partner merchant(s), and the transaction processing server processor 106 can target, in response to a transaction conducted or in the process of being conducted at the partner merchant, the customer or user 100 conducting the transaction based at least partially on the loyalty segment in which the customer or user 100 is segmented, for example, by looking up the customer or user 100 based at least partially on the PAN associated with the transaction. The transaction processing server processor 106 can automatically request that the partner merchant approve enrolling the customer or user 100 in an incentive program or modification the current transaction, e.g., by applying a discount, if the customer or user 100 is in the loyalty segment and/or a focus subset of customers to be targeted to achieve an identified merchant objective. For example, a customer or user 100 conducting a transaction at a partner merchant of the identified merchant may be automatically enrolled in a cross-promotion between the identified merchant and the partner merchant and/or automatically receive a discount as a result of the cross-promotion between the identified merchant and the partner merchant based at least partially on the loyalty segment in which the customer or user is segmented. In some non-limiting embodiments or aspects, modification of the current transaction may be limited to customers or users 100 that also have at least one transaction within a recent time period, e.g., a week, at the identified merchant, in addition to the current transaction at the partner merchant.

With continued reference to FIG. 3, in one non-limiting embodiment or aspect, steps 3024 and/or 3026 may include receiving, with at least one processor, current transaction data associated with at least one current transaction of the at least one customer with at least one other merchant; determining, with at least one processor, the loyalty segment in which the at least one customer is segmented and/or classified based at least partially on the current transaction data; and communicating, in response to the determination, a targeted message to a mobile device of the at least one customer, wherein the targeted messages causes the mobile device of the at least one customer to automatically display at least one of the following: a redemption offer data associated with the identified merchant, program data associated with a merchant loyalty program associated with the identified merchant, or any combination thereof. The transaction processing server processor 106 can target, in response to a transaction conducted or in the process of being conducted at a partner merchant or the at least one peer merchant, the customer or user 100 conducting the transaction based at least partially on the loyalty segment in which the customer or user 100 is segmented, for example, by looking up the customer or user 100 based at least partially on the PAN associated with the transaction. For example, a customer or user 100 conducting a transaction at a partner merchant of the identified merchant may be automatically targeted with a redemption offer, such as a discount coupon, at the identified merchant and/or reminded of a cross-promotion, e.g., a reminder that conducting transactions at both the identified merchant and the partner merchant will result in an automatic discount or other incentive. A customer or user 100 conducting a transaction at the at least one peer merchant can be automatically targeted with a redemption offer, such as a discount coupon for use at the identified merchant for the same goods or services being purchased at the at least one peer merchant, and/or reminded of a merchant loyalty program associated with the identified merchant for the same goods or services being purchased at the at least on peer merchant.

Referring again to FIGS. 1 and 2, in some non-limiting embodiments or aspects, step 3010, as described above, may instead or additionally be performed by the issuer system 110 and/or the merchant system 102. The issuer system 110 and/or the merchant system 102 may be in communication with the transaction processing server processor 106 to receive information from the transaction processing server processor 106, such as the loyalty segment in which a customer or user 100 is segmented and/or customers in the focus subset of customers. The issuer system 110 and/or the merchant system 102, from the information received from the transaction processing server processor 106, may initiate the previously described target actions. In other words, the issuer system 110 and/or the merchant system 102 may automatically enroll the customer or user 100 in an incentive program by communicating with the transaction service provider database 108 and/or an issuer database 111 and/or automatically modify a current transaction of the customer or user 100. In other non-limiting examples, the issuer system 110 and/or the merchant system 102 may communicate with a computing device 116 of the customer or user 100, as described above. Further, it will be appreciated that the issuer system 110 and/or the merchant system 102 may take any other action directed to incentivizing, educating, or encouraging a customer or user 100 to more frequently use their portable financial device at the identified merchant or a partner merchant thereof, as described above, and/or to modify transactions of the customer or user 100. It is to be understood that the transaction processing server processor 106, the issuer system 110, and/or the merchant system 102 may automatically initiate the targeted communication(s).

In a further, non-limiting embodiment or aspect, a computer program product for modeling customer behavior in a behavior-monitored system, the plurality of customers having a plurality of transactions with a plurality of merchants, includes at least one non-transitory computer readable medium including program instructions that, when executed by at least one processor, cause the at least one processor to execute the previously-described method (e.g., method 2000). The at least one processor may include the transaction processing server processor 106 and/or one or more processors in the issuer system 110 and/or the merchant system 102.

The computer program product may include a plurality of computer-readable media, such as a first computer-readable medium and a second computer readable medium. The first computer-readable medium may be located at the transaction processing server processor 106. The second computer-readable medium may be located remote from the transaction service provider server, such as at the issuer system 110 and/or the merchant system 102, and/or distributed across two or more of the transaction processing servers 104.

Examples

Referring to FIG. 6, a process flow diagram shows an exemplary process 6000 for modeling customer behavior in a behavior-monitored system, the plurality of customers having a plurality of transactions with a plurality of merchants. It will be appreciated that the steps shown in the process flow diagram are for exemplary purposes only and that in various non-limiting embodiments or aspects, additional or fewer steps may be performed to segment a plurality of customers in a behavior-monitored system.

At a first step (s1), the transaction processing server 104 receives or retrieves transaction data associated with the plurality of transactions between the plurality of customers or users and the plurality of merchants from the transaction service provider database 108 and/or the issuer database 111. In a second step (s2) the transaction processing server 104 identifies at least one peer merchant associated with an identified merchant of the plurality of merchants. In a third step (s3), the transaction processing server 104 determines an identified merchant engagement level of each customer of the plurality of customers with respect to the identified merchant based at least partially on the transaction data and determines a peer merchant engagement level of each customer of the plurality of customers with respect to the at least one peer merchant based at least partially on the transaction data. In a fourth step (s4) the transaction processing server 104 segments the plurality of customers into a plurality of loyalty segments based at least partially on the identified merchant engagement level of each customer and the peer merchant engagement level of each customer.

In a fifth step (s5), the transaction processing server 104 may automatically enroll at least one customer of the plurality of customers in an incentive program based at least partially on a loyalty segment in which the at least one customer is segmented and/or classified, for example, by updating the enrollment database in the transaction processing server database 108. In some non-limiting embodiments or aspects, the transaction processing server 104 applies at least one rule based at least partially on at least one identified merchant objective to at least one target subset of customers in at least one target segment of the plurality of loyalty segments to identify at least one focus subset of customers of the plurality of customers, and automatically enrolls the at least one focus subset of customers in the incentive program. For example, referring to FIG. 7, for an identified merchant objective of increasing wallet share, the transaction processing server processor 106 can apply rules that identify local geographic locations, e.g., localities, of a larger geographic area, e.g., a city, with higher potential to achieve the identified merchant objective of increasing wallet share. The transaction processing server 106 can apply rules that identify localities in a city, e.g., Dubai in FIG. 7, in which a percentage of customers that are in the switchers loyalty segment in the locality is greater than a percentage of customers that are in the switchers loyalty segment in the city, and a spend growth rate of the locality is greater than a spend growth rate of the city, and/or rules that identify localities of the city in which a percentage of customers in the locality that are in the switchers loyalty segment divided by a percentage of customers that are in the city and in the switchers loyalty segment is within a threshold value, e.g., a percentage of switchers in a locality divided by a percentage of switchers in a city between 0.9 and 1 and in a locality in the top 3 in in terms of market spend share. The transaction processing server processor 106 can determine an estimated opportunity size for the identified local geographic location(s) based at least partially on a difference in a market share between the local geographic location and the larger geographic location multiplied by an overall spend in the local geographic region. For example, as shown in FIG. 7, the localities of Town/Business Bay, Marina & Jbr & Palm, and Al Barsha (Affi) are identified as the 3 localities in the example city of Dubai with the highest potential to increase wallet share for an example identified merchant.

Figure 8:
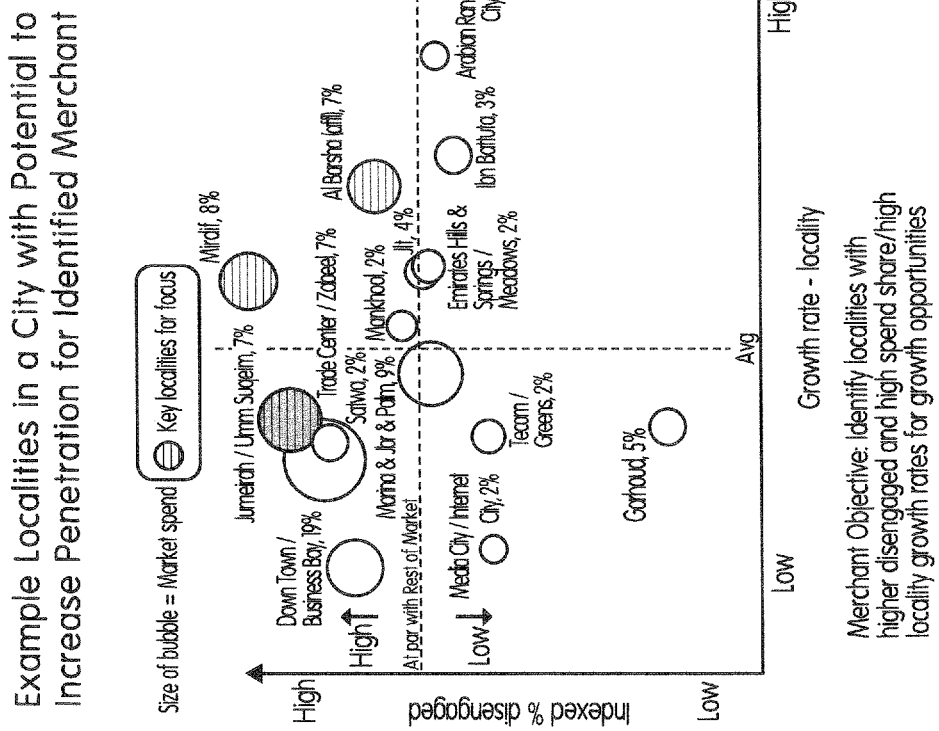
FIG. 8 is a graphical representation of example potentials of geographic locations to achieve a merchant objective of increased penetration.

FIG. 8 is a graphical representation of example potentials of geographic locations to achieve a merchant objective of increased penetration. As shown in FIG. 8, for an identified merchant objective of increasing penetration in an identified merchant disengaged segment, the transaction processing server processor 106 can apply rules that identify local geographic locations, e.g., localities a of a larger geographic area, e.g., a city, such as Dubai in FIG. 8, in which a percentage of customers in the identified merchant disengaged segment is greater than a percentage of customers in the city in the identified merchant disengaged segment and a spend growth rate of the locality is greater than a spend growth rate of the city, and/or rules that identify localities of the city in which a percentage of customers in the identified merchant disengaged segment divided by a percentage of customers in the city in the identified merchant disengaged segment is within a threshold value, e.g., a percentage of disengaged customers in a locality divided by a percentage of disengaged customers in a city between 0.9 and 1 and in a locality in the top 3 in terms of market spend share. The transaction processing server processor 106 can determine an estimated opportunity size for the identified local geographic location(s) based at least partially on a difference in a percentage of disengaged customers between the local geographic location and the larger geographic location multiplied by an average spend per customer. For example, as shown in FIG. 8, the localities of Jumeirah/Umm Suqeim, Al Barsha, and Midrif are identified as the 3 localities in the example city of Dubai with the highest potential to increase penetration for an example identified merchant.

In a sixth step (s6a-s6c), the transaction processing server 104 may monitor transaction data of a customer or user 100 with respect to the loyalty segment in which the customer or user 100 is segmented. For example, a customer or user 100 initiates a financial transaction using a portable financial device associated with the transaction service provider (s6a). The transaction may be a financial transaction with an identified merchant system 6002. In the case of a financial transaction with the identified merchant system 6002, the customer or user 100 provides information from his/her personal financial device, such as an account identifier (e.g., 16-digit PAN) and, in some examples, to complete a financial transaction in exchange for goods or services offered by the identified merchant. The identified merchant system 6002, in response, processes the transaction. The identified merchant system 6002 (s6b) sends transaction data concerning the financial transaction between the identified merchant system 6002 and the customer or user 100 to the transaction processing server 104. Information sent to the transaction service provider server may include: date and time of the transaction, location of the transaction including a geographic code of the merchant and/or a geographic code associated with the account of the user 100, amount of the transaction, type of goods or services purchased, and/or the like. The transaction processing server 104 relays the information collected regarding the user's transaction(s) as the transaction data to the transaction service provider database 108 (s6c). Steps s6a through s6c of FIG. 6 may be performed for any number of transactions for any number of customers or users 100.

In a seventh step (s7), the transaction processing server 104 may automatically modify a current transaction of the at least one customer of the plurality of customers with the identified merchant system 6002 based at least partially on a loyalty segment in which the at least one customer is segmented and/or classified. For example, the transaction processing server 104 may transmit an instruction to the identified merchant system 6002 to discount the transaction, or the identified merchant system 6002 may automatically discount the transaction based at least partially on information sent from the transaction processing server 104 indicating a customer loyalty segment in which the customer or user 100 is segmented.

Steps (s8a-s8c) show the customer or user 100 conducting a financial transaction with a partner merchant(s) system 6004 of a partner merchant of the identified merchant. Steps (s8a-s8c) are substantially the same as steps (s6a-s6c) except they are performed with the partner merchant(s) system 6004 instead of the identified merchant system 6002 and, therefore, a description thereof is omitted in the interest of brevity.

In a ninth step (s9), the transaction processing server 104 may send an authorization message to the partner merchant(s) system 6004 that includes at least one of the following: a request to enroll the customer or user 100 in at least one incentive program associated with the identified merchant, a request to modify at least one current transaction, or any combination thereof. In a tenth step (s10), the transaction processing server 104 receives an authorization response message from the partner merchant(s) system 6004 after communicating the authorization request message. In an eleventh step (s11a-s11b), the transaction processing server 104 at least one of the following: automatically enrolls the at least one customer in the at least one incentive program (s11a), automatically modifies the at least one current transaction (s11b), or any combination thereof. In an alternative twelfth step (s12a-s12b), the transaction processing server 104 determines a loyalty segment in which the customer or user 100 is segmented based at least partially on the current transaction data (512a) and communicates a targeted message to a mobile device 116 of the customer or user 100 (s12b). The targeted message may cause the mobile device of the at least one customer to automatically display (s13) at least one of the following: redemption offer data associated with the identified merchant, program data associated with a merchant loyalty program associated with the identified merchant, or any combination thereof.

Steps (s14a-s14c) show a customer or user 100 conducting a financial transaction with a peer merchant(s) system 6006 of the at least one peer merchant. Steps (s14a-s14c) are substantially the same as steps (s6a-s6c) except they are performed with the peer merchant(s) system 6006 instead of the identified merchant system 6002 and, therefore, a description thereof is omitted in the interest of brevity. In a fifteenth step (s15a-s15b), the transaction processing server 104 may determine the loyalty segment in which the at least one customer is segmented and/or classified based at least partially on the current transaction data (s15a) and communicate, in response to the determination, a targeted message to a mobile device 116 of the customer or user 100 (515b), such as a discount coupon for use at the identified merchant for the same goods or services being purchased at the peer merchant(s) system 6006, and/or a reminder of a merchant loyalty program associated with the identified merchant for the same goods or services being purchased at the peer merchant(s) system 6006.

Although the invention has been described in detail for the purpose of illustration based at least partially on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

The invention claimed is:

1. A computer-implemented method for modeling customer behavior in a behavior-monitored system, the computer-implemented method comprising:

determining, with at least one processor, an identified merchant engagement level of at least one customer with respect to an identified merchant of a plurality of merchants based on transaction data associated with a plurality of transactions between the at least one customer and the plurality of merchants, wherein the identified merchant of the plurality of merchants is associated with at least one peer merchant of the plurality of merchants;

determining, with at least one processor, a peer merchant engagement level of the at least one customer with respect to the at least one peer merchant based on the transaction data;

receiving, with at least one processor, current transaction data associated with at least one current transaction of the at least one customer with at least one other merchant different than the identified merchant;

determining, with at least one processor, a loyalty segment of the at least one customer based on the identified merchant engagement level of the at least one customer, the peer merchant engagement level of the at least one customer, and the current transaction data;

communicating, in response to the determination, an authorization request message to the at least one other merchant, wherein the authorization request message includes at least one of the following: a request to enroll the at least one customer in at least one incentive program associated with the identified merchant, a request to modify the at least one current transaction as a result of a cross-promotion with the identified merchant, or any combination thereof;

receiving, with at least one processor, an authorization response message after communicating the authorization request message; and in response to receiving the authorization response message, with the at least one processor, at least one of the following: automatically enrolling the at least one customer in the at least one incentive program, automatically modifying the at least one current transaction, or any combination thereof, wherein the plurality of transactions is between a plurality of customers and the plurality of merchants, the plurality of customers including the at least one customer, the method further comprising:

determining, with at least one processor, the identified merchant engagement level of each customer of the plurality of customers with respect to the at least one peer merchant based at least partially on the transaction data;

determining, with at least one processor, the peer merchant engagement level of each customer of the plurality of customers with respect to the at least one peer merchant based at least partially on the transaction data; and segmenting, with at least one processor, the plurality of customers into a plurality of loyalty segments based at least partially on the identified merchant engagement level of each customer of the plurality of customers and the peer merchant engagement level of each customer of the plurality of customers;

segmenting, with at least one processor, the plurality of customers into one of an identified merchant high engagement band, an identified merchant moderate engagement band, and an identified merchant low engagement band based at least partially on the identified merchant engagement level of each customer;

segmenting, with at least one processor, the plurality of customers into one of a peer merchant high engagement band, a peer merchant moderate engagement band, and a peer merchant low engagement band based at least partially on the peer merchant engagement level of each customer;

comparing, with at least one processor, the identified merchant high engagement band, the identified merchant moderate engagement band, and the identified merchant low engagement band against the peer merchant high engagement band, the peer merchant moderate engagement band, and the peer merchant low engagement band to segment the plurality of customers into the plurality of loyalty segments;

segmenting, with at least one processor, a customer of the plurality of customers into a first segment of the plurality of loyalty segments based at least partially on a determination that the customer is: i) segmented in the identified merchant high engagement band and segmented outside the peer merchant high engagement band or ii) segmented in the identified merchant moderate engagement band and segmented in the peer merchant low engagement band;

segmenting, with at least one processor, the customer of the plurality of customers into a second segment of the plurality of loyalty segments based at least partially on a determination that the customer is: i) segmented in the identified merchant high engagement band and segmented in the peer merchant high engagement band or ii) segmented in the identified merchant moderate engagement band and segmented outside the peer merchant low engagement band;

segmenting, with at least one processor, the customer of the plurality of customers into a third segment of the plurality of loyalty segments based at least partially on a determination that the customer is segmented in the identified merchant low engagement band and segmented outside the peer merchant low engagement band; and segmenting, with at least one processor, the customer of the plurality of customers into a fourth segment of the plurality of loyalty segments based at least partially on a determination that the customer is segmented in the identified merchant low engagement band and segmented in the peer merchant low engagement band.

2. The computer-implemented method of claim 1, further comprising:

determining, with at least one processor, customer attributes associated with the at least one customer based at least partially on the transaction data, wherein the customer attributes include at least one of the following: an amount spent by the at least one customer at a merchant over a period of time, a number of transactions by the at least one customer at the merchant over the period of time, an average amount spent per transaction by the at least one customer at the merchant over the period of time, an average amount of time between transactions and/or since a last transaction by the at least one customer at the merchant over the period of time, a number of other merchants at which the at least one customer has transactions over the period of time, or any combination thereof, wherein the identified merchant engagement level of the at least one customer is determined based at least partially on the customer attributes associated with the at least one customer for the identified merchant, and wherein the peer merchant engagement level of the at least one customer is determined based at least partially on the customer attributes associated with the at least one customer for the at least one peer merchant.

3. The computer-implemented method of claim 1, wherein determining the loyalty segment of the at least one customer further comprises comparing the identified merchant engagement level of the at least one customer and the peer merchant engagement level of the at least one customer to at least one threshold level.

4. The computer-implemented method of claim 1, wherein the loyalty segment indicates a probability that the at least one customer is at least one of the following: loyal to the identified merchant, willing switch from the at least one peer merchant to the identified merchant, disengaged from the identified merchant, disengaged from a specific type of transaction associated with the identified merchant, or any combination thereof.

5. The computer-implemented method of claim 1, wherein the at least one customer is automatically enrolled in the at least one incentive program in response to receiving the authorization response message.

6. The computer-implemented method of claim 1, wherein the current transaction of the at least one customer is automatically modified in response to receiving the authorization response message.

7. The computer-implemented method of claim 1, further comprising:
communicating a targeted message to a mobile device of the at least one customer, wherein the targeted messages causes the mobile device of the at least one customer to automatically display at least one of the following: a redemption offer data associated with the identified merchant, program data associated with a merchant loyalty program associated with the identified merchant, or any combination thereof.

8. A system for modeling customer behavior in a behavior-monitored system, the system comprising at least one server computer including at least one processor, the at least one server computer programmed and/or configured to:
determine an identified merchant engagement level of at least one customer with respect to an identified merchant of a plurality of merchants based on transaction data associated with a plurality of transactions between the at least one customer and the plurality of merchants, wherein the identified merchant of the plurality of merchants is associated with at least one peer merchant of the plurality of merchants;
determine a peer merchant engagement level of the at least one customer with respect to the at least one peer merchant based on the transaction data;
receive current transaction data associated with at least one current transaction of the at least one customer with at least one other merchant different than the identified merchant;
determine a loyalty segment of the at least one customer based on the identified merchant engagement level of the at least one customer, the peer merchant engagement level of the at least one customer, and the current transaction data;
communicate, in response to the determination, an authorization request message to the at least one other merchant, wherein the authorization request message includes at least one of the following: a request to enroll the at least one customer in at least one incentive program associated with the identified merchant, a request to modify the at least one current transaction as a result of a cross-promotion with the identified merchant, or any combination thereof;
receive an authorization response message after communicating the authorization request message; and
in response to receiving the authorization response message, at least one of the following: automatically enroll the at least one customer in the at least one incentive program, automatically modify the at least one current transaction, or any combination thereof,
wherein the plurality of transactions is between a plurality of customers and the plurality of merchants, the plurality of customers including the at least one customer, wherein the at least one server computer is programmed and/or configured to:
determine the identified merchant engagement level of each customer of the plurality of customers with respect to the at least one peer merchant based at least partially on the transaction data;
determine the peer merchant engagement level of each customer of the plurality of customers with respect to the at least one peer merchant based at least partially on the transaction data; and
segment the plurality of customers into a plurality of loyalty segments based at least partially on the identified merchant engagement level of each customer of the plurality of customers and the peer merchant engagement level of each customer of the plurality of customers;
segment the plurality of customers into one of an identified merchant high engagement band, an identified merchant moderate engagement band, and an identified merchant low engagement band based at least partially on the identified merchant engagement level of each customer; and
segment the plurality of customers into one of a peer merchant high engagement band, a peer merchant moderate engagement band, and a peer merchant low engagement band based at least partially on the peer merchant engagement level of each customer;
compare the identified merchant high engagement band, the identified merchant moderate engagement band, and the identified merchant low engagement band against the peer merchant high engagement band, the peer merchant moderate engagement band, and the peer merchant low engagement band to segment the plurality of customers into the plurality of loyalty segments;
segment a customer of the plurality of customers into a first segment of the plurality of loyalty segments based at least partially on a determination that the customer is: i) segmented in the identified merchant high engagement band and segmented outside the peer merchant high engagement band or ii) segmented in the identified merchant moderate engagement band and segmented in the peer merchant low engagement band;
segment the customer of the plurality of customers into a second segment of the plurality of loyalty segments based at least partially on a determination that the customer is: i) segmented in the identified merchant high engagement band and segmented in the peer merchant high engagement band or ii) segmented in the identified merchant moderate engagement band and segmented outside the peer merchant low engagement band;
segment the customer of the plurality of customers into a third segment of the plurality of loyalty segments based at least partially on a determination that the customer is segmented in the identified merchant low engagement band and segmented outside the peer merchant low engagement band; and
segment the customer of the plurality of customers into a fourth segment of the plurality of loyalty segments based at least partially on a determination that the customer is segmented in the identified merchant low engagement band and segmented in the peer merchant low engagement band.

9. The system of claim 8, wherein the at least one server computer is programmed and/or configured to:
    determine customer attributes associated with the at least one customer based at least partially on the transaction data, wherein the customer attributes include at least one of the following: an amount spent by the at least one customer at a merchant over a period of time, a number of transactions by the at least one customer at the merchant over the period of time, an average amount spent per transaction by the at least one customer at the merchant over the period of time, an average amount of time between transactions and/or since a last transaction by the at least one customer at the merchant over the period of time, a number of other merchants at which the at least one customer has transactions over the period of time, or any combination thereof,
    wherein the identified merchant engagement level of the at least one customer is determined based at least partially on the customer attributes associated with the at least one customer for the identified merchant, and
    wherein the peer merchant engagement level of the at least one customer is determined based at least partially on the customer attributes associated with the at least one customer for the at least one peer merchant.

10. The system of claim 8, wherein the at least one server computer is programmed and/or configured to:
    compare the identified merchant engagement level of the at least one customer and the peer merchant engagement level of the at least one customer to at least one threshold level to determine the loyalty segment of the at least one customer.

11. The system of claim 8, wherein the loyalty segment indicates a probability that the at least one customer is at least one of: loyal to the identified merchant, willing switch from the at least one peer merchant to the identified merchant, disengaged from the identified merchant, disengaged from a specific type of transaction associated with the identified merchant, or any combination thereof.

12. The system of claim 8, wherein the at least one customer is automatically enrolled in the at least one incentive program in response to receiving the authorization response message.

13. The system of claim 8, wherein the current transaction of the at least one customer is automatically modified in response to receiving the authorization response message.

14. The system of claim 8, wherein the at least one server computer is programmed and/or configured to:
    communicate a targeted message to a mobile device of the at least one customer, wherein the targeted messages causes the mobile device of the at least one customer to automatically display at least one of the following: a redemption offer data associated with the identified merchant, program data associated with a merchant loyalty program associated with the identified merchant, or any combination thereof.

15. A computer program product for modeling customer behavior in a behavior-monitored system, the computer program product comprising at least one non-transitory computer-readable medium including program instructions that, when executed by at least one processor cause the at least one processor to:
    determine an identified merchant engagement level of at least one customer with respect to an identified merchant of a plurality of merchants based on transaction data associated with a plurality of transactions between the at least one customer and the plurality of merchants, wherein the identified merchant of the plurality of merchants is associated with at least one peer merchant of the plurality of merchants;
    determine a peer merchant engagement level of the at least one customer with respect to the at least one peer merchant based on the transaction data;
    receive current transaction data associated with at least one current transaction of the at least one customer with at least one other merchant different than the identified merchant;
    determine a loyalty segment of the at least one customer based on the identified merchant engagement level of the at least one customer, the peer merchant engagement level of the at least one customer, and the current transaction data;
    automatically communicate, in response to the determination, an authorization request message to the at least one other merchant, wherein the authorization request message includes at least one of the following: a request to enroll the at least one customer in at least one incentive program associated with the identified merchant, a request to modify the at least one current transaction as a result of a cross-promotion with the identified merchant, or any combination thereof;
    receive an authorization response message after communicating the authorization request message; and
    in response to receiving the authorization response message, at least one of the following: automatically enroll the at least one customer in the at least one incentive program, automatically modify the at least one current transaction, or any combination thereof,
    wherein the plurality of transactions is between a plurality of customers and the plurality of merchants, the plurality of customers including the at least one customer, wherein the program instructions further cause the at least one processor to:
    determine the identified merchant engagement level of each customer of the plurality of customers with respect to the at least one peer merchant based at least partially on the transaction data;
    determine the peer merchant engagement level of each customer of the plurality of customers with respect to the at least one peer merchant based at least partially on the transaction data; and
    segment the plurality of customers into a plurality of loyalty segments based at least partially on the identified merchant engagement level of each customer of the plurality of customers and the peer merchant engagement level of each customer of the plurality of customers;
    segment the plurality of customers into one of an identified merchant high engagement band, an identified merchant moderate engagement band, and an identified merchant low engagement band based at least partially on the identified merchant engagement level of each customer; and
    segment the plurality of customers into one of a peer merchant high engagement band, a peer merchant moderate engagement band, and a peer merchant low engagement band based at least partially on the peer merchant engagement level of each customer;
    compare the identified merchant high engagement band, the identified merchant moderate engagement band, and the identified merchant low engagement band against the peer merchant high engagement band, the peer merchant moderate engagement band, and the peer merchant low engagement band to segment the plurality of customers into the plurality of loyalty segments;
segment a customer of the plurality of customers into a first segment of the plurality of loyalty segments based at least partially on a determination that the customer is: i) segmented in the identified merchant high engagement band and segmented outside the peer merchant high engagement band or ii) segmented in the identified merchant moderate engagement band and segmented in the peer merchant low engagement band;
segment the customer of the plurality of customers into a second segment of the plurality of loyalty segments based at least partially on a determination that the customer is: i) segmented in the identified merchant high engagement band and segmented in the peer merchant high engagement band or ii) segmented in the identified merchant moderate engagement band and segmented outside the peer merchant low engagement band;
segment the customer of the plurality of customers into a third segment of the plurality of loyalty segments based at least partially on a determination that the customer is segmented in the identified merchant low engagement band and segmented outside the peer merchant low engagement band; and
segment the customer of the plurality of customers into a fourth segment of the plurality of loyalty segments based at least partially on a determination that the customer is segmented in the identified merchant low engagement band and segmented in the peer merchant low engagement band.

* * * * *